United States Patent
Freeman et al.

(10) Patent No.: US 9,542,596 B2
(45) Date of Patent: Jan. 10, 2017

(54) SYSTEMS AND APPARATUS FOR FACILITATING THE PRODUCTION AND PRESENTATION OF STROKES GAINED GOLF STATISTICS

(71) Applicants: Freeman & Freeman Golf, Inc., Meridian, ID (US); Scott Michael Freeman, Meridian, ID (US)

(72) Inventors: Scott Michael Freeman, Meridian, ID (US); Dan Matthew Freeman, Hailey, ID (US)

(73) Assignee: Freeman & Freeman Golf, Inc.

( * ) Notice: Subject to any disclaimer, the term of this patent is extended or adjusted under 35 U.S.C. 154(b) by 165 days.

(21) Appl. No.: 14/274,850

(22) Filed: May 12, 2014

(65) Prior Publication Data

US 2015/0182836 A1 Jul. 2, 2015

Related U.S. Application Data

(60) Provisional application No. 61/920,996, filed on Dec. 26, 2013.

(51) Int. Cl.
*A63F 9/24* (2006.01)
*G06K 9/00* (2006.01)
*G09B 29/00* (2006.01)

(52) U.S. Cl.
CPC ............. *G06K 9/00342* (2013.01); *A63F 9/24* (2013.01); *G09B 29/007* (2013.01)

(58) Field of Classification Search
CPC ............... A63B 2069/3602; A63B 2069/3605; A63B 2024/0056; A63B 2071/0691; A63B 2220/12; A63B 2220/20; A63B 71/0669; G01S 19/19
(Continued)

(56) References Cited

U.S. PATENT DOCUMENTS 5,779,566 A * 7/1998 Wilens .................... A63B 69/36 473/131
6,585,609 B2 * 7/2003 Bays ...................... A63B 71/06 473/407

(Continued)

FOREIGN PATENT DOCUMENTS

WO WO 0078411 A1 * 12/2000 ......... A63B 24/0021

OTHER PUBLICATIONS

Sanders, Peter; "www.shotbyshot.com".*

(Continued)

*Primary Examiner* — Joshua Kennedy
(74) *Attorney, Agent, or Firm* — Dan Freeman; Scott Freeman

(57) ABSTRACT

Systems, methods, and apparatus to facilitate the production and presentation of strokes gained golf statistics. Some systems include mobile devices for the collection of essential shot data necessary for producing strokes gained statistics during play. The device travels with a golfer, measures and records distance-to-hole automatically using GPS and/or laser and/or radio technology, in combination with one of various lie-type classifications (tee, fairway, rough, sand, green, recovery, penalty, hazards, etc.) before and after a golf shot as selected by the golfer using human judgement. The device transfers essential shot data to a remote database and receives and displays calculated strokes gained results.

16 Claims, 15 Drawing Sheets

(58) Field of Classification Search
USPC .................................................. 473/407, 409
See application file for complete search history.

(56) References Cited

U.S. PATENT DOCUMENTS

| | | | | |
|---|---|---|---|---|
| 6,900,759 | B1* | 5/2005 | Katayama | A63B 71/0669 |
| | | | | 342/357.52 |
| 8,172,702 | B2* | 5/2012 | Meadows | A63B 57/00 |
| | | | | 473/407 |
| 8,617,005 | B2 | 12/2013 | Moran et al. | |
| 8,708,841 | B2* | 4/2014 | Doherty | A63B 69/36 |
| | | | | 473/131 |
| 2002/0072815 | A1* | 6/2002 | McDonough | A63B 69/36 |
| | | | | 700/92 |
| 2002/0151994 | A1* | 10/2002 | Sisco | A63B 71/0669 |
| | | | | 700/91 |
| 2010/0022331 | A1* | 1/2010 | Schneider | A63B 57/00 |
| | | | | 473/409 |
| 2013/0041487 | A1 | 2/2013 | Messner et al. | |
| 2015/0126308 | A1* | 5/2015 | Penn | A63B 69/36 |
| | | | | 473/407 |

OTHER PUBLICATIONS

Broadie, Mark, "Assessing Golfer Performance Using Golfmetrics", Science and Golf IV: Proceedings of the 2008 World Scientific Congress of Golf, Chapter 34 pp. 253-262, vol. V, Energy in Motion Inc., Mesa, AZ.
Broadie, Mark, "Assessing Golfer Performance on the PGA Tour", Interfaces, published online Apr. 1, 2012, pp. 146-165, vol. 42, issue 2.

* cited by examiner

| stroke | Hole #1 par 4 | | | | sg (+/-) |
|---|---|---|---|---|---|
| | pre | | post | | |
| | dist | lie | dist | lie | |
| 1 | 378 | T | 112 | R | (0.11) |
| 2 | 112 | R | 11 | F | (0.13) |
| 3 | 11 | F | 1 | G | 0.18 |
| 4 | 1 | G | - | C | 0.00 |

FIG. 15

| Hole #1 sg summary | |
|---|---|
| category | sg (+/-) |
| tee, par 4/5 | (0.11) |
| 200+ | 0.00 |
| 150-200 | 0.00 |
| 100-150 | (0.13) |
| 50-100 | 0.00 |
| 0-50 | 0.18 |
| putting | 0.00 |
| sg total | (0.06) |

FIG. 16

| Round sg summary | |
|---|---|
| category | sg (+/-) |
| tee, par 4/5 | (2.09) |
| 200+ | (1.71) |
| 150-200 | (1.74) |
| 100-150 | (5.46) |
| 50-100 | (1.32) |
| 0-50 | (2.01) |
| putting | (4.04) |
| sg total | (18.4) |

FIG. 17

SYSTEMS AND APPARATUS FOR FACILITATING THE PRODUCTION AND PRESENTATION OF STROKES GAINED GOLF STATISTICS

CROSS-REFERENCE TO RELATED APPLICATIONS

This application claims the benefit of provisional patent application No. 61/920,996, entitled "Strokes Gained Data Collection Method, Database, and Analysis Website," by inventors Dan Freeman and Scott Freeman, filed on Dec. 26, 2013, which application is hereby incorporated by reference.

FEDERALLY SPONSORED RESEARCH

Not Applicable

SEQUENCE LISTING OR PROGRAM

Not Applicable

BACKGROUND

Field

This application relates generally to golf statistics, specifically to methods, systems, and apparatus that facilitate the production and presentation of strokes gained golf statistics.

Prior Art

Despite the growing popularity of golf at both the amateur and professional levels, the sport has been relatively slow to develop quality statistics. With the development of better analytical tools, many sports have seen dramatic changes on many levels. In the last several years, the golf world has been introduced to a promising new statistical methodology called "strokes gained", and golf is now poised to join other sports with revolutionary analytics.

Many people who understand the game of golf have long known, or at least suspected, that standard golf statistics can be very misleading, particularly when it comes to measuring the skills of a golfer in a given category. For example, the statistic called "Total Putts" is often used to measure the putting skill of a golfer. However, "total putts" is a very poor reflection of putting skill because it is strongly tied to a non-putting skill: the proximity to the hole of an approach shot is a major factor in how many putts a golfer would be expected to take to finish a hole. Consequently, a golfer who hit approach shots to an average of eight feet from the hole for a round might take 30 putts in a round. Another golfer who hit approach shots to an average of 25 feet from the hole for a round could also take 30 putts for a round. The "total putts" statistic would indicate that the golfers had equivalent putting skill for the round. It is obvious, however, that the second golfer had a dramatically better round of putting.

Similar examples can be given for other standard statistics. The "driving accuracy" statistic is a poor measure of skill off the tee: a 300 yard drive in the middle of the fairway is greatly superior to a 200 yard drive in the center of the fairway. "Driving Distance" is no better: 310 yard drives in deep rough, or out of bounds, are clearly inferior to 260 yard drives in the fairway. Combining those two statistics into a new statistic called "Total Driving" does not solve the problem, and in many ways makes it worse. Even long-standing statistics like "Greens in Regulation" are deeply flawed. Designed to reflect skill from tee to green, the statistic does not take into account the proximity-to-hole of approach shots, giving equal value to approaches two feet or 80 feet from the hole.

A major advance in golf statistics began around 2003, when the PGA TOUR began to employ a unique data collection system called ShotLink™. Comprising data for millions of shots taken by professional golfers during tournament play since 2003, the ShotLink™ system operates on the PGA TOUR. The ShotLink™ system is operated by a small staff of employees and a large volunteer workforce. It normally takes approximately 250 volunteers per event to collect data for a golf tournament, using laser technology to measure distances and physical observation to determine lie type, along with significant additional technology to collect and store the data.

Around the same time the PGA TOUR was beginning to collect detailed data on the PGA TOUR using ShotLink™, Mark Broadie, a business professor at Columbia University, was developing a unique way to analyze golfer performance using a program called Golfmetrics. This software was the first to use detailed strokes-to-hole benchmarks and was the first embodiment of strokes gained methodology. Prior to obtaining ShotLink™ data, the Golfmetrics analytical software was dependent upon manual collection of data during rounds of golf, using pencil and paper, and subsequent manual entry of the data into a database. In the beginning, Golfmetrics used data almost entirely from amateur golfers.

Strokes gained methodology began to take a more refined shape when Broadie gained access to ShotLink™ data, and he began to apply his Golfmetrics analytics to that data. With the quality and quantity of data provided by ShotLink™, Broadie was able to refine the details of strokes gained methodology. Broadie's work appeared in a white paper entitled "Assessing Golfer Performance Using Golfmetrics" (Chapter 34 in *Science and Golf V: Proceedings of the* 2008 *World Scientific Congress of Golf*, eds. D. Crews and R. Lutz. Energy in Motion Inc., Mesa, Ariz., 253-262). It also appeared in "Assessing Golfer Performance on the PGA Tour", Apr. 27, 2010, revised Apr. 8, 2011. In "Assessing Golfer Performance on the PGA Tour", in addition to explaining the statistical formulas involved, Broadie published tables of PGA TOUR player strokes gained data representing the average strokes-to-hole values for distances-to-hole from 0 to 600 yards, from lies including tee, fairway, rough, sand, 'recovery', and green (for putts). The two papers, including the tables of PGA averages, as well as a similar table Broadie created for putting, are incorporated herein in their entirety by reference.

Strokes gained methodology works by first establishing a strokes-to-hole benchmark for a specified group of golfers. Broadie determined that the most significant factors for determining the number of strokes it takes to complete a hole are distance-to-hole and lie type. Using ShotLink™ data representing millions of shots performed by a group comprised of all PGA TOUR players over the course of many years, Broadie determined the average strokes-to-hole from every distance-to-hole and lie type combination possible.

Virtually any benchmark could similarly be established by calculating the average strokes-to-hole for all ball conditions for any specified group of golfers, but the PGA TOUR benchmark proves particularly valuable. The PGA TOUR benchmark is exceptionally solid and stable, as it is based upon millions of shots by a very consistently performing group. It also provides a benchmark of the highest level performers in the world, which neatly establishes a top-level foundation to which all other shots can be compared.

Once the benchmark is established, calculating strokes gained values for a shot requires a specific set of data for that shot: the identity of the golfer performing the shot, pre-shot distance-to-hole, pre-shot lie type, post-shot distance-to-hole, and post-shot lie type. Representing the minimum data necessary to implement strokes gained methodology, these five pieces of data are herein referred to as "essential shot data".

Broadie describes strokes gained statistics as "a quantitative measure of the quality of a golf shot", and presents a simple formula for its calculation:

$$g_i = J(d_i, c_i) - J(d_i+1, c_i+1) - 1.$$

Where $g_i$ is the strokes gained on the ith shot on a hole that starts at $(d_i, c_i)$ and finishes at $(d_i+1, c_i+1)$, J is the benchmark in terms of the average number of strokes a PGA TOUR player takes to finish the hole from the current location, di is the distance-to-hole from the current condition of the ball, $c_i$ is the lie type of the current condition of the ball. Strokes gained represents the decrease in the average number of strokes to finish the hole from the beginning of the shot to the end of the shot, minus one to account for the stroke taken.

This statistic can be applied to value each shot individually in terms of strokes, gained or lost, to the benchmark, and cumulatively to assign a strokes gained over the entire hole, round, tournament, date range, specific shot category, or any specific range of golf shots desired. This can be done for any shot or defined group of shots on a golf course: any distance or distance range, any lie, any round or group of rounds. The spectrum of application to specific categories is virtually endless.

To those who understand it, strokes gained methodology produces statistics that are clearly superior to standard golf statistics, largely making them obsolete. There is little doubt that the strokes gained method of analysis will eventually dominate the landscape of golf statistics. Unlike traditional golf statistics, strokes gained statistical analysis provides the ability to quantify the quality of any shot against a statistically significant benchmark in terms of fractions of strokes. Strokes gained methodology provides a powerful tool to analyze all elements of golfer performance, and a way to measure virtually any factor, including courses, clubs, weather, etc. Strokes gained methodology has the potential to revolutionize the way people think about golf.

However, the integration of strokes gained statistics into the world of golf has been surprisingly slow. On the PGA TOUR, where ShotLink™ data is already collected and strokes gained analysis tools are already in place, the only statistic currently available is Strokes Gained Putting, which represents a small fraction of the statistics that could be made available. PGA TOUR players and coaches do not have access to their personal strokes gained statistics other than Stokes Gained Putting, and golf analysts and the media have few tools to use the significant power of strokes gained to enhance commentary and analysis of tournaments.

Because the PGA TOUR has been so slow to develop and promote strokes gained, the huge amount of people who view PGA TOUR events on television are not educated about its value. Most people simply don't understand how strokes gained works or why it is potentially valuable. If they knew more about it, many golfers would desire strokes gained as an analytical tool for their own games. For most people interested in golf, Strokes Gained Putting is a stat they may be slightly familiar with, but generally strokes gained is shrouded in mathematical mystery. Many are under the false assumption that strokes gained is impossible without ShotLink™ technology for collecting data, and therefore believe they could not have access to it without an army of volunteers showing up at their local course armed with lasers and trucks filled with computers.

Strokes gained statistics offer enormous value to golfers of all levels, and to the industry as a whole. Largely viewed as a "professional statistic", it will soon become clear that this type of game analysis has just as much to offer the non-PGA TOUR golfer, if not more. The problem, then, is largely one of accessibility. For the hordes of golfers who do not play in PGA TOUR events, there is essentially no access to strokes gained statistics. Golfmetrics, though it was originally designed to analyze the games of amateur golfers for the purpose of academic study, never had the ability or the intention to offer golfers as a whole access to strokes gained statistics. Nearly all of the amateur golfer data in Golfmetrics was collected by Broadie himself, while playing golf with other people. The collection of data was strictly manual, using pencil and paper, and was also entered into the database manually. It was a tedious process and was never made available to golfers generally, but rather served to further Broadie's studies. Eventually, Broadie gained access to ShotLink™ data and turned his analytical attention to PGA TOUR professionals. ShotLink™ data, it must be stressed, provides data only for 150 elite golfers that play in top level PGA TOUR events. There is zero ShotLink™ data collection available to the rest of the estimated 80 million golfers in the world.

Currently, a golfer interested in strokes gained statistics to measure aspects of his or her own golf game would be required to manually collect the necessary data for a game of golf and manually do the necessary mathematical calculations. Even in a best-case scenario, after the tedious process of data collection and analysis, results would be severely limited. Without the ability to transfer data to a database capable of automatic analysis, only the most basic strokes gained statistics could be produced.

Clearly, there is a need in the art to make strokes gained statistics more easily accessible to golfers.

Part of the solution to the problem lies in making the collection of data during a game of golf as simple and non-intrusive as possible, and producing useful, easily understood statistics for golfers without requiring them to execute or understand the analytics which create them. Any data collection system that requires manual recording and/or manual entry into a computer is unlikely to be widely adapted, as it interrupts a golfer during play and/or takes too much time.

The key that unlocks the potential of strokes gained methodology lies in utilizing mobile computing devices to collect data during games of golf and transferring the data to databases equipped to perform strokes gained analysis. Fortunately, mobile devices are already used by many golfers in order to obtain distances during play. These devices offer a variety of functions. Adapting and/or designing these devices to easily collect distance-to-hole data and lie type data provides an elegant solution to the problem of strokes gained accessibility. Using the distance-determining functionality these devices already possess helps streamline the necessary collection of data.

The last several years have seen a rapid expansion in the use of mobile electronic devices during real games of golf, and they offer a variety of functions. These devices include GPS devices, laser devices, hybrid devices utilizing both laser and GPS, and software applications designed for smart phones and other portable computers. These devices are primarily used to determine distances during a round of golf, but often include other features. Because they are so well known in the art, they will only be generally described here. Many companies have had such devices on the market for several years, including Garmin, Callaway, Bushnell, Nikon, Skygolf, and many others. Smart phone applications that serve a similar purpose have also been available for many years, and include apps such as Swing by Swing and GolfLogix.

Common to all these devices and applications is their limited ability to collect data during a game of golf, which currently prevents them from contributing to the production of strokes gained statistics. When devices do feature the ability to collect data, it is typically comprised of score, shot distances, and whether a ball is being played from a tee, fairway, or green. This information is sometimes used to calculate some of the traditional golf statistics, such as driving distance, percentage of fairways hit, greens in regulation, and number of putts. None of the devices attempt to provide strokes gained golf statistics. None are equipped to collect the specific combination of data necessary to calculate strokes gained statistics—the "essential shot data" described above. Where fairway lie determination is implemented, it is accomplished through the limitations of GPS location determination in combination with GPS course mapping, and due to the limitations of GPS accuracy, often erroneously determines whether a ball is in the fairway or not. Lie type is not a determination that is best made using "automatic" methods. Using human judgment to determine lie type is very simple, far more accurate, and much less prone to errors.

There is prior art in the area of data collection, transference to a database, and analytical output to a platform such as a website for the purpose of offering golfers statistical measurements of their games. Some devices, smart phone applications, and websites that use shot data include game analysis tools geared toward the traditional golf statistics such as greens in regulation, number of putts, up-and-down percentage, driving distance and accuracy, scrambling, clubs used, etc. Some devices and smart phone applications which automatically transfer data collected during a round to a database, and in conjunction with a website, attempt to offer more sophisticated statistical measurements than traditional golf stats, but none offer strokes gained statistics.

For example, www.shotstohole.com incorporates data consisting of calculated strokes-to-hole derived from that player's data. The associated U.S. patent application Ser. No. 13/504,983 (Publication no. US20130041487) also associated with Application no. PCT/AU2010/001451 (Publication no. WO2011050419 A1), by Shots to Hole Pty Ltd, is for a "Golf improvement Aid" which includes a GPS device that records, in sequence, the distance-to-hole for each shot. The data transfers to a database and is made available to subscribers at www.shotstohole.com. However, the data involved is only distance data, which is insufficient for strokes gained analysis. The system does not provide for or mention strokes gained statistics.

Another patent application similar in concept is "Systems and methods for golf performance analytics", Publication no. US20080188330, U.S. application Ser. No. 12/012,942 by Prolooper. This is described as "Systems and methods providing statistical analytics of golf performance including text, tabular, graphic, and image-based outputs that include trends information for the golfer, all based upon actual golf play on course situations, wherein the golfer inputs shot data during play, without interrupting the flow of the game, and transfers the shot data for analytics and review online". Embodiments of this patent describe the transfer of golfer data to a central server using GPS devices that can be used for analysis and interaction by the golfer. The mobile app and associated website, www.swingbyswing.com, do not provide the collection of data necessary for strokes gained analysis, nor do they provide for or mention strokes gained statistics.

Another recent development in data collection technology is a system disclosed in a patent entitled "Golf Data Collection", U.S. Pat. No. 8,617,005 B2. This patent describes: "A system for golf data collection comprises an apparatus arranged to be worn about the body of a golfer during a game of golf. The apparatus includes a positioning system for determining various locations of a golfer during the game, a tag reader for reading a club held in close proximity to the apparatus around the time of striking a golf ball, and a processor for correlating the location of the golfer with the time at which a tag is read to enable the path of a golf ball throughout the game of golf to be determined." This concept introduces a novel system for collecting shot data during a game of golf, but fails to include data for lie type, which is an essential element in the production of strokes gained statistics. As such, this invention is incapable of collecting the data necessary to enable strokes gained methodology. There is no mention of strokes gained data or statistics in the patent, and no strokes gained statistics are generated or presented when using the associated commercially available product.

Several similar efforts to implement methods and systems for collecting, transferring, analyzing, and outputting personal golf statistics have been undertaken. However, none of the patents, devices, software, hardware, or smart phone applications known in the art has been adapted to collect the necessary data for strokes gained statistical analysis. They do not employ a means for recording the "essential shot data", which includes both the distance-to-hole and the lie type classification of a ball at rest both before and after performing a shot in a game of golf. Additionally, none of the systems known in the art mention, provide for, or utilize strokes gained methodology for statistical analysis. Nor do they produce, generate, or present strokes gained statistics.

Clearly, there is a need in the art for methods, systems, and apparatus that facilitate the production and presentation of strokes gained statistics, so that this powerful analytical tool can be made available to any golfer who desires it.

SUMMARY

The following presents a general summary of aspects of the invention in order to provide a basic understanding of the invention and various features of it. This summary is not intended to limit the scope of the invention in any way, but it simply provides a general overview of the invention and context for the more detailed description that follows.

In one aspect, the present disclosure provides apparatus for collecting data during a game of golf, thereby facilitating the production of strokes gained statistics. Some aspects relate to a mobile device used to collect data during a game of golf. The mobile device has a means for traveling with a golfer during a game of golf. The device has a means for automatically determining distance-to-hole while playing a hole in said game of golf, using GPS, laser, or some other measuring technology. The device has a means for recording essential shot data for one or more golf shots. The essential shot data is recorded before and after the performance of a golf shot, and includes distance-to-hole, lie type data, and data identifying the golfer performing the shot. Lie type is determined by human judgment. The mobile device also has a means for transferring at least the essential data for one or more golf shots to a database. The mobile device may further include a means for recording additional data.

Additional aspects of the present disclosure provide systems for facilitating the production and presentation of strokes gained golf statistics. At least some example systems include: a) one or more mobile devices for collecting and transferring essential sh+ot data, and b) one or more databases for compiling and organizing essential shot data received from one or more mobile devices.

Other example systems for facilitating the production and presentation of strokes gained golf statistics include: a) one or more mobile devices for collecting and transferring essential shot data, b) one or more databases for compiling and organizing essential shot data received from one or more mobile devices, and c) a data analysis system for analyzing data in a database, the data analysis system including strokes gained methodology, thereby producing strokes gained golf statistics.

Other example systems for facilitating the production and presentation of strokes gained golf statistics include: a) one or more mobile devices for collecting and transferring essential shot data, b) one or more databases for compiling and organizing essential shot data received from one or more mobile devices, c) a data analysis system for analyzing data in a database, the data analysis system including strokes gained methodology, thereby producing strokes gained golf statistics, and d) an output system for outputting strokes gained statistics to one or more computing platforms, said computing platforms including but not limited to websites, desktop computers, tablets, and smart phones.

Additional aspects of the present disclosure provide methods for facilitating the production and presentation of strokes gained golf statistics. At least some example methods include the steps of: a) collecting data during a game of golf with a mobile device, and b) transferring the data to a database.

Other example methods for facilitating the production and presentation of strokes gained golf statistics include: a) collecting data during a game of golf with a mobile device, b) transferring the data to a database, and c) compiling the data into a database, the data in the database arranged in a way to facilitate strokes gained analysis.

Other example methods for facilitating the production and presentation of strokes gained golf statistics include: a) collecting data during a game of golf with a mobile device, b) transferring the data to a database, c) compiling the data into a database, the data in the database arranged in a way to facilitate strokes gained analysis, and d) analyzing the data contained in the database using strokes gained methodology, thereby establishing strokes gained statistics.

Other example methods for facilitating the production and presentation of strokes gained golf statistics include: a) collecting data during a game of golf with a mobile device, b) transferring the data to a database, c) compiling the data into a database, the data in the database arranged in a way to facilitate strokes gained analysis, d) analyzing the data contained in the database using strokes gained methodology, thereby establishing strokes gained statistics, and e) outputting said strokes gained statistics to one or more computer platforms Other systems, methods, apparatus, features, and advantages of the present disclosure will be, or will become, apparent to one of ordinary skill in the art upon examination of the following figures and detailed description. It is intended that all such additional systems, methods, apparatus, features, and advantages be included within this description and this summary, be within the scope of the present disclosure, and be protected by the following claims.

DRAWINGS

Figures

FIG. 15 illustrates an example of a way in which one hole may be presented on a scorecard, with strokes gained calculations for each shot.

FIG. 16 illustrates an example of a strokes gained table for one hole, with strokes gained results for the hole in selected distance categories, plus a par-4/par-5 tee category, and a putting category representing all shots taken with a "green" lie type.

FIG. 17 illustrates an example of a strokes gained table representing an entire 18-hole round.

REFERENCE NUMERALS

Figure 1:
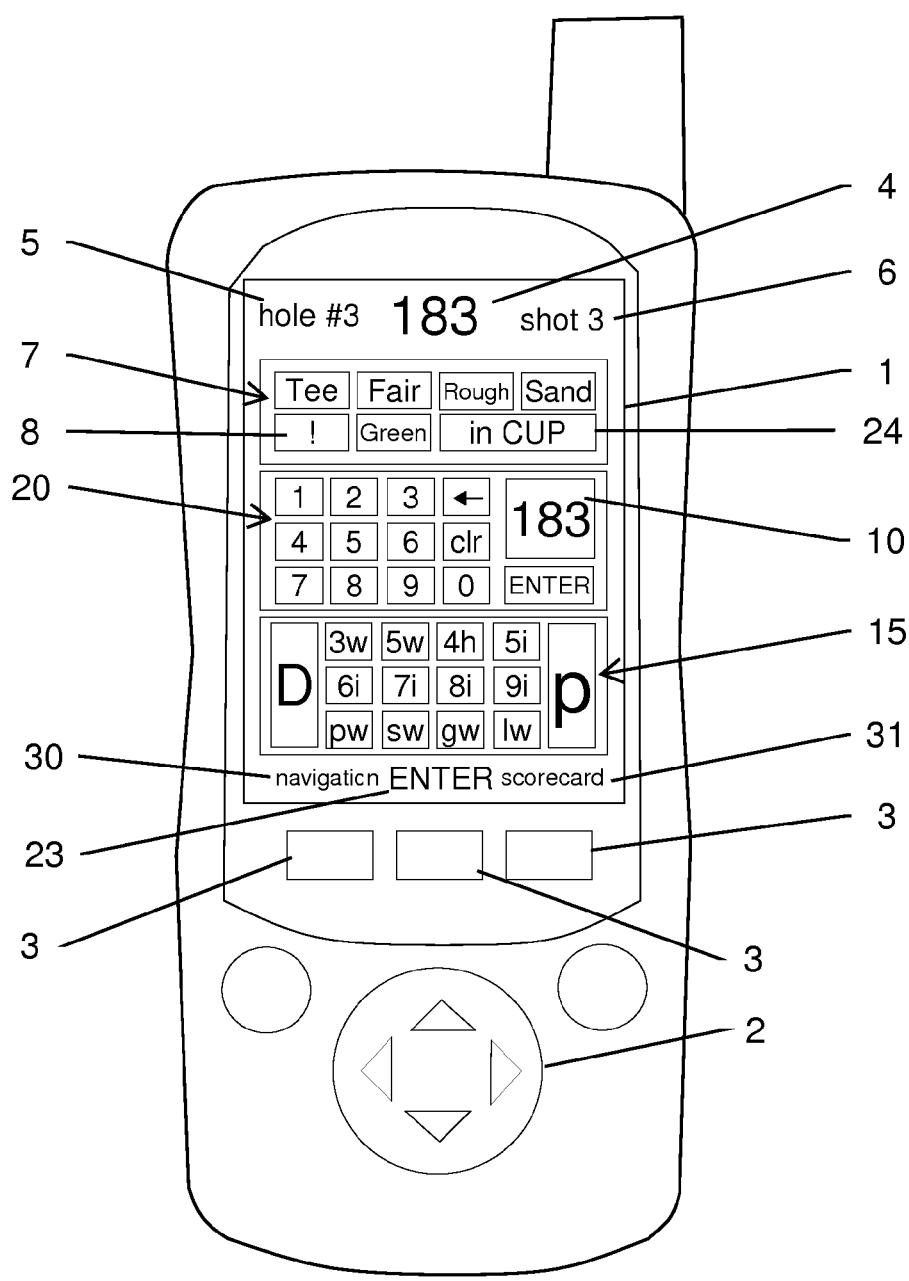
FIG. 1 illustrates a GPS type mobile device that may be used to collect data, with a display screen showing a data collection screen page for recording lie type, distance-to-hole, and club type.
Figure 2:
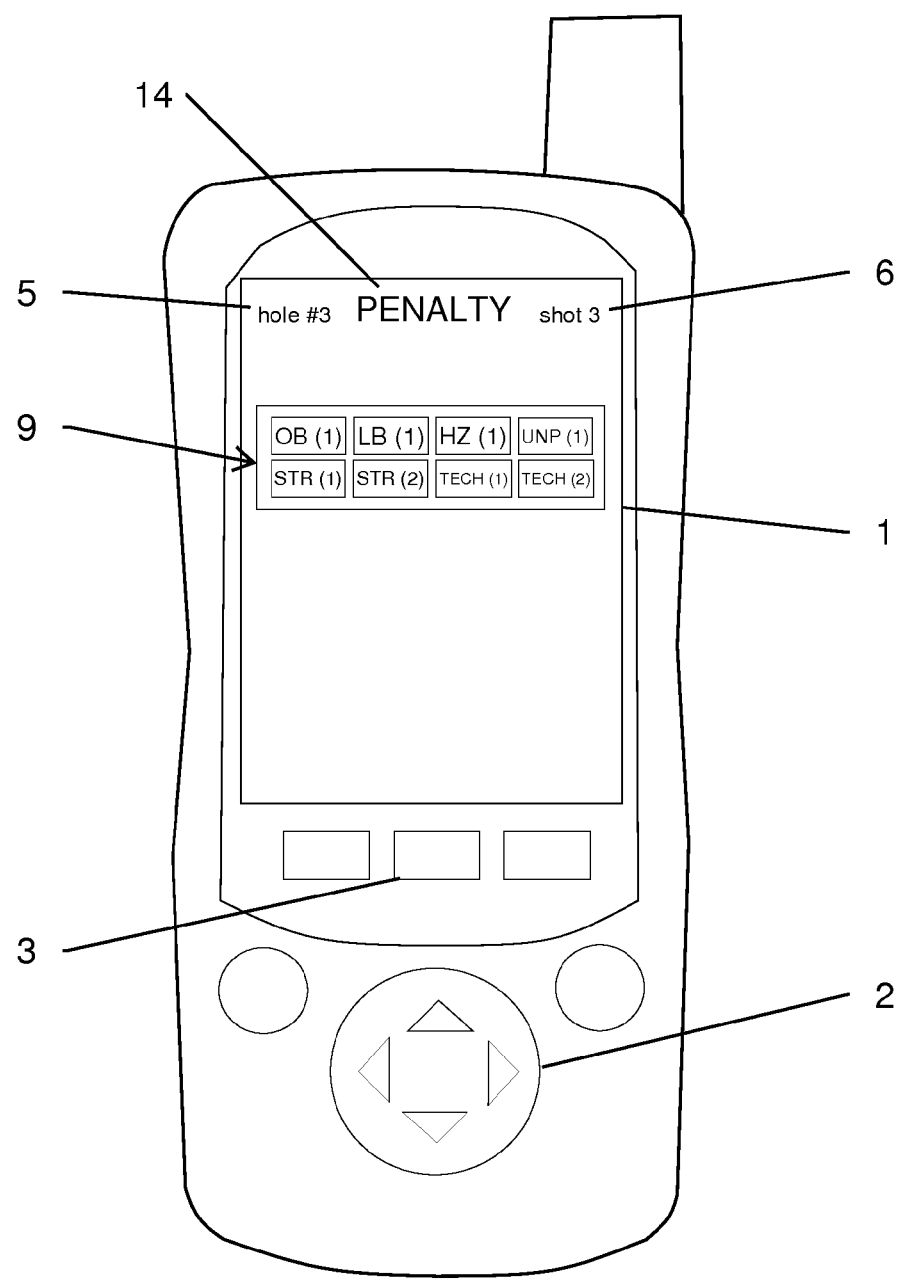
FIG. 2 illustrates a GPS type mobile device that may be used to collect data, with a display screen showing a data collection screen page for recording penalty type.
Figure 3:
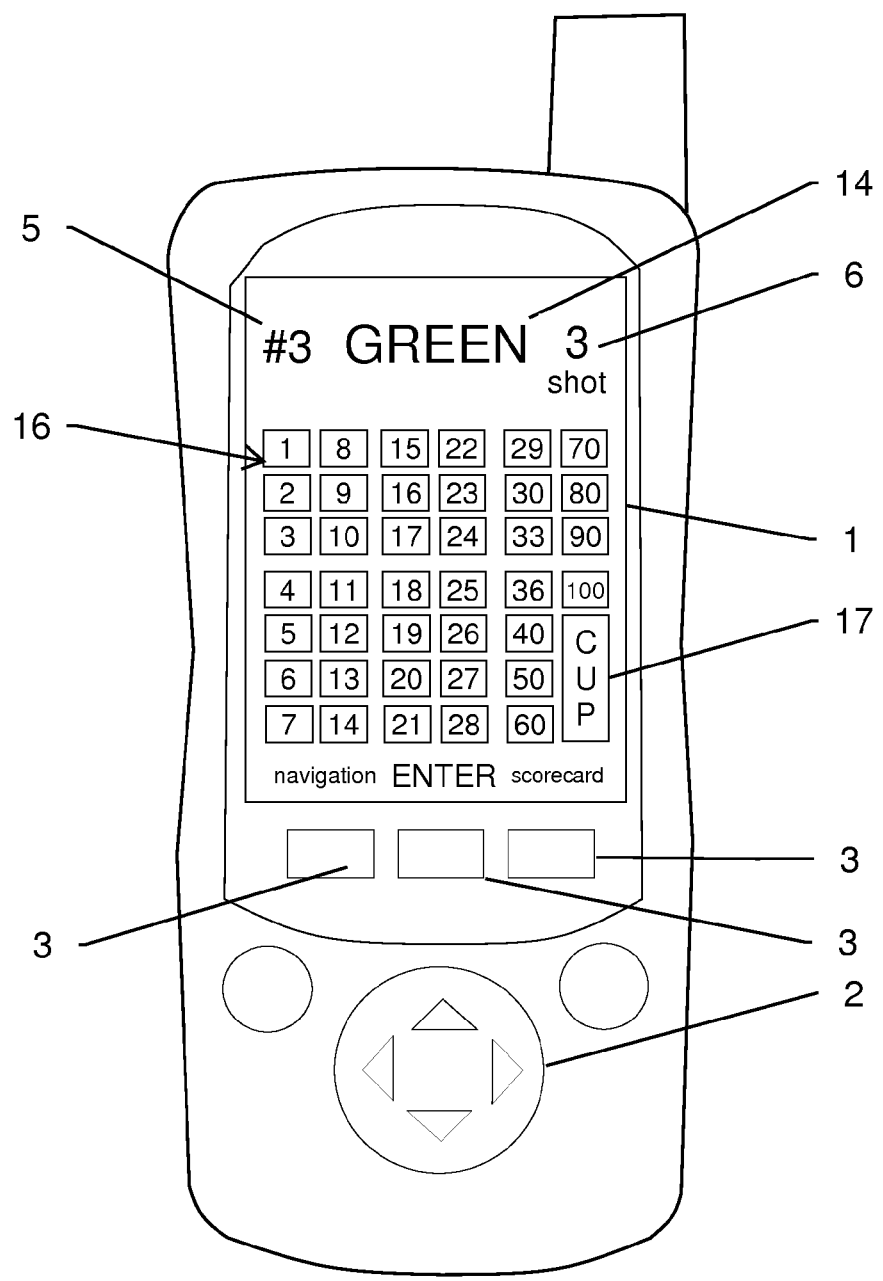
FIG. 3 illustrates a GPS type mobile device that may be used to collect data, with a display screen showing a data collection screen page for recording distance-to-hole on greens.

1. Display screen
2. Toggle button
3. Select button
4. GPS distance-to-hole reading
5. Hole number
5a. Next Hole Scorecard View
5b. Previous Hole Scorecard View
6. Shot number
7. Lie Type selections
8. "Penalty" Lie Type Button
9. Penalty Type Selections
10. Manual distance override
13. "Green" Lie Type Button
14. Screen page title
15. Club selections
16. Putting distance selections
17. "Mark Cup" button
19. Scorecard-style display
20. Distance-to-hole data entry display
21. Laser distance reading
22. Place for mounting smart phone
23. "Enter" button
24. "In cup" lie type button
30. "Go to navigation screen page" button
31. "Go to scorecard screen page" button

DETAILED DESCRIPTION

Described herein are embodiments of methods, systems, and apparatus for facilitating the production and presentation of strokes gained golf statistics. The following description is exemplary in nature and is not intended to limit the scope, applicability, or configuration of the invention in any way. Various changes to the described embodiments and methods may be made in the function and arrangement of the elements described herein without departing from the scope of the invention.

A general description of aspects of the invention followed by a more detailed description of specific examples of the invention follows.

General Description of Various Aspects of the Invention:

At least some aspects of this invention relate to systems for facilitating the production and presentation of strokes gained golf statistics. Such systems may include, for example, one or more of the following: a) a data collection system for collecting golf shot data using one or more mobile devices; (b) a database system for compiling golf shot data received from one or more mobile devices like those described above and below; (c) a statistical analysis system utilizing strokes gained methodology for analyzing data in a database like that described above and below; (d) a computer output system for outputting stroke gained data and/or statistics.

Systems for Collecting Data Using One or More Mobile Devices:

Strokes gained golf analysis and statistics have proven invaluable for better evaluation of various golf skills. This unique method of analysis only becomes possible with the collection of a specific set of shot data resulting from golfers performing actual golf shots, herein called "essential shot data". The shot data required for each shot must at least include:

1. Pre-shot distance to hole
2. Pre-shot lie type
3. Post-shot distance to hole
4. Post-shot lie type
5. Identification of golfer performing the shot Normally, the necessary collection of data has only been possible in one of two ways:

1. Manual recording by a golfer during play, with subsequent manual data input to database
2. Recording by large, organized teams of people with access to expensive equipment (ShotLink™).

At least some embodiments of this invention provide a means for recording the necessary data during real games of golf with relative simplicity and ease.

Accordingly, as described above, at least some embodiments may include a system for collecting data using one or more mobile devices. The use of mobile devices for collecting the essential data offers increased accessibility to strokes gained statistics, making this valuable game evaluation tool available to a far wider range of golfers than was before possible.

A mobile device may be defined as any device capable of staying near a golfer during a game of golf. For example, the device could be carried in some way on the body of a golfer, such as on the belt, hip, hand, wrist, or any other position on the body. Alternatively, the mobile device may travel with a golfer during a game of golf in other ways. For example, the device could be carried by a caddie or some other person traveling with the golfer. As another example, the device could be carried on a golf cart, golf bag, or some other piece of equipment that travels with a golfer during play. A person skilled in the art will recognize that a device can travel with a golfer during a game of golf in a variety of ways.

Alternatively, in some embodiments the device may stay near a golfer in a game of golf that does not require the golfer to move significantly from place to place. For example, consider a game of golf taking place on a range or some other alternative playing field, where a golfer could engage in a form of golf from a single hitting station or a plurality of hitting stations in close proximity.

The data collected by the mobile device should at least include the essential shot data, described above and below. Without essential shot data, strokes gained analysis is impossible. Essential shot data includes the "ball condition" of a ball at rest both before and after a single golf shot. Ball condition includes two pieces of information:

1. The distance to the hole of the ball at rest
2. The lie type of the ball at rest Additionally, essential shot data includes the identity of the golfer performing the shot, either by name or some other means of identification.

The distance-to-hole data is simply a measurement of the ball at rest to the hole or flag being played. The device may be capable of determining the distance-to-hole of a ball at rest "automatically". For example, the device may employ GPS technology, laser technology, radio technology, radar technology, and/or any other technology that is capable of determining position or distance. The device may be capable of utilizing one or more such technologies. The golfer may have a choice in determining which technology to use to determine distance-to-hole for any given ball position. The golfer may also have the option of determining distance-tohole "manually". For example, the golfer may decide to use on-course markers or some other way to determine distance-to-hole.

The lie type of a ball at rest must be determined in at least some cases by simple judgment of the golfer or data collecting person, using basic human observation and/or visual evidence. Once the appropriate lie type is determined, it is inputted into the mobile device by selecting on the device interface the proper lie type category from a group including lies widely understood in the game of golf. For example, "tee", "fairway", "rough", "sand", or "green". In some embodiments, the lie type may be chosen from a small group of possible lies such as those listed above. Some embodiments may include further choices such as "lateral hazard", "out of bounds", and "penalty stroke". Some embodiments might further include more detailed lie determinations such as different types of rough, "divot", "short-sided" shots, lies that require "recovery" shots, surface slopes associated with lie, or different lies in the sand. One familiar with the game of golf will recognize that there are potentially many ways to categorize lie types, and a mobile device may accommodate one or more of these various categories.

In some embodiments, the selection of lie types may include "in hole", "in-cup", or some similar designation, in order to designate the final ball position and the hole location for a given hole or target. In some examples, such a selection on the device and marking the associated position could activate an accurate recalculation of all distance-to-hole measurements for the hole in question, since the position of the hole has been accurately marked and may be an improvement upon previous measurements and/or determinations.

The device may be capable of at least temporarily recording and storing data during a game of golf. In some embodiments, recorded data may be stored permanently or semi-permanently. In some embodiments, recorded data could be stored until it is transferred to another data storage system and/or database.

The recording of data during a game of golf could be executed in various ways. For example, at least one button on the device may be selected while in close proximity to a ball at rest before and after performing a shot. A golfer may stand near a ball at rest and activate a button or some other switch that effectively "marks" the position. In some embodiments, the marking of the ball position may include GPS coordinates. In some embodiments, the marking of the ball position may record a distance-to-hole based on a previously executed laser measurement for the position in question. In some embodiments, the golfer may have the option of marking a ball and/or manually inputting distance to the hole. In some embodiments, the recording of data may be executed using voice recognition technology, so that data could be input into the device vocally.

In some embodiments, the device may be capable of recording more data than just the essential shot data described above. For example, the device may be capable of recording "additional data" that allows more advanced strokes gained analysis. Additional data may include one or more of the following:
  1. Date
  2. Course played
  3. Hole played
  4. Tees played
  5. Data for all shots taken during an entire round of golf Some embodiments of mobile devices may be able to record further additional data. For example, some devices may have the ability to collect and record information on wind speed, wind direction, temperature, green speed, club used, etc. Additional data, while not necessary for optimal strokes gained analysis, allows for some very powerful levels of analysis, especially for golfers or interested parties who have a connection to the extra information the data provides.

This data would still be fully encompassed by strokes gained methodology and shot quality measurements. Such additional data attributes for each shot might include:
  1. wind speed data
  2. wind direction data
  3. temperature data
  4. precipitation data
  5. green speed ratings
  6. tournament or non-tournament round
  7. club used
  8. equipment used Additional data may be entered before, during, and/or after a game of golf. One familiar with the game of golf will recognize that there are many potential types of additional data. The types of additional data mentioned above merely serve as examples.

There are many possible design variations for a mobile device. For example, devices might fall into one or more of the following basic design categories:
  1. Watches
  2. Devices that attach to a hat
  3. Devices that attach to a piece of clothing
  4. Devices that attach to a belt or pocket
  5. Devices that can be held in the hand
  6. Devices that are carried on or attach to a golf cart
  7. Devices that attach to a push cart or pull cart
  8. Devices meant to be carried by a caddie or other person traveling with the golfer
  9. Devices that feature GPS technology
  10. Devices that feature laser technology
  11. Devices that feature GPS and laser technology
  12. Smart phone apps
  13. Tablet apps
  14. Devices using voice recognition
  15. Devices worn by the golfer that are activated by a separate device installed in a golf club or other piece of golf equipment In some embodiments, devices may be built from scratch, "from the ground up".

In some embodiments, the necessary features could be added to or blended into existing device designs to allow for the requisite data collection and storage.

In some embodiments, devices may possess additional features beyond the ability to collect and record data. These additional features may include one or more of the following:
  1. Distance information on a golf course, including distance to one or more important course features such as center of green, back of green, front of green, and distance to key features like bunkers, hazards, etc.
  2. Maps of the course, hole, or playing field under consideration, either animated or based upon aerial photographs or satellite images
  3. A scorecard for one or more golfers
  4. Strokes gained targets for different levels of golfer skill In some embodiments, the device may be able to transfer the collected data to a database. The database could be located on the device, on a computer, or on a central server. Transfer of data could occur directly, in real time, by direct download of data, or through a connection with one or more intermediate devices. For example, a mobile device may be connected to a home computer, from which the data may be transferred.

Additional potential features of this aspect of the invention relate to methods of operating and/or using the systems described above, e.g., to collect shot data using one or more mobile devices during a game of golf. Such methods may include the steps of carrying a mobile device during a game of golf, collecting data for a game of golf using a mobile device, the mobile device having a means to automatically determine distance-to-hole, recording data on the mobile device, and transferring data to a database. Other steps may include carrying a mobile device during a game of golf, determining the distance-to-hole of a ball at rest using GPS or laser technology, recording the distance-to-hole of a ball at rest, determining the lie type of a ball at rest using human judgment, selecting the appropriate lie type from categories displayed on the device, performing a golf shot for the ball at rest, and transferring data to a database that is capable of storing the data necessary for strokes gained analysis.

Database System for Compiling Golf Shot Data Received from One or More Mobile Devices:

Shot data collected by mobile devices may be transferred to a database. A database allows for the shot data to be compiled and organized in a way that allows strokes gained methodology to proceed. Accordingly, at least some embodiments may include a database system for compiling and/or storing shot data. The shot data would include at least essential shot data as described above and may also include additional data as described above.

In some embodiments, the database would receive shot data from multiple golfers resulting from multiple shots performed during multiple games of golf over the course of multiple days.

In some embodiments, the database would receive shot data from a plurality of types of mobile devices.

In some embodiments, the database would receive shot data from a single type of mobile device.

In some embodiments, data in the database would be organized and/or arranged to allow for various strokes gained analysis of the data.

Additional potential features of this aspect of the invention relate to methods for operating and/or using the systems described above, e.g., to compile and/or organize data from one or more mobile devices that collect data during a game of golf. For example, steps may include providing a database designed to compile and/or organize data for strokes gained analysis, receiving data from one or more mobile devices, at least some of the mobile devices having a means to determine distance-to-hole automatically and having a means to record lie type data after determining lie type using human judgment, and organizing and/or arranging the data in the database for strokes gained analysis.

One skilled in the art will recognize that there are many possible platforms for database embodiments, and that the way the database is arranged could vary widely without departing from the scope of the invention.

Systems for Analyzing Data Utilizing Strokes Gained Methodology:

At least some embodiments may include a statistical analysis system utilizing strokes gained methodology for analyzing data in a database like that described above and below. One skilled in the art will be familiar with strokes gained methodology, and basic strokes gained methodology does not fall within the scope of this patent. It is described thoroughly in Broadie's paper, contained herein in its entirety.

One skilled in the art will recognize that strokes gained methodology may be used to analyze data for a single golf shot or a plurality of golf shots, performed by a single golfer or a plurality of golfers.

One skilled in the art will recognize further that strokes gained methodology utilizes benchmarks. These benchmarks may be established by calculating or otherwise determining the average strokes-to-hole required to hole-out for any given distance-to-hole and lie type combination. The distances-to-hole may be grouped into distance ranges rather than specific distances. The strokes-to-hole required to hole out may be determined by data gathered during games of golf. Benchmarks may represent strokes-to-hole for any given set of golfers.

In some embodiments, the benchmarks used for strokes gained methodology may include an established PGA TOUR benchmark that is known in the art, derived from a multitude of shots performed by pro golfers during selected PGA TOUR events. In some embodiments, ShotLink™ data may be used to help determine benchmarks.

In some embodiments, strokes gained methodology may be used to analyze data contained in a database like that described above and below. In some embodiments, the data in the database may be collected utilizing mobile devices as described above and below.

In some embodiments, the benchmark used to analyze data using strokes gained methodology may be the PGA TOUR benchmark$|_{[SF1]}$ established by Mark Broadie using ShotLink™ data. This table is included herein.

In some embodiments, a benchmark used to analyze data using strokes gained methodology may be created by analyzing data for a specified group of golfers. For example, a benchmark could be established for golfers of a given handicap level, age group, gender, other criteria, or some combination thereof. This could be done from scratch or by using the PGA TOUR benchmark as a reference point.

In some embodiments, strokes gained methodology may be used to establish statistics for one or more individual golfers, or for groups of golfers. Statistics may include positive or negative strokes gained values for a given distance-to-hole range. Statistics may include positive or negative strokes gained values for a given lie type. Statistics may include positive or negative strokes gained values for a given distance-to-hole range combined with a given lie type or plurality of lie types. Statistics may include positive or negative strokes gained values for various categories for a single round of golf. Statistics may include positive or negative strokes gained values for a plurality of rounds of golf. Statistics may include positive or negative strokes gained values in various categories calculated per shot. Statistics may include positive or negative strokes gained values for various categories over a specified number of rounds. Statistics may include positive or negative strokes gained values for various categories over a specified length of time. Statistics may include positive or negative strokes gained values for various categories showing change over a specified number of rounds. Statistics may include positive or negative strokes gained values for various categories showing change over a specified length of time. Statistics may be used to rank players in various categories.

One skilled in the art will recognize that the inherent flexibility of strokes gained methodology can be used to generate a huge variety of statistics, and that it would not be practical to list all possibilities here. Therefore, it should be understood that strokes gained methodology has the ability to quantify the quality of any single golf shot or group of shots, and therefore has the ability to produce a huge variety of analytical results.

In some embodiments, strokes gained methodology may be used to quantify the difficulty of a hole.

In some embodiments, strokes gained methodology may be used to quantify the difficulty of a course, zones on a course, and/or pin positions on a course.

In some embodiments, strokes gained methodology may be used to quantify the difficulty of given lie type for a given course or a given hole.

In some embodiments, strokes gained methodology may be used to quantify the difficulty of a given zone on a given hole.

In some embodiments, strokes gained methodology may include the use of course difficulty adjustments. For example, strokes gained data may indicate that the greens on a course are playing more difficult than average on a given day, so that strokes gained putting statistics may be adjusted to take into account the difficulty of the greens. Similar adjusted strokes gained statistics may be applied to account for the difficulty of nearly any variable.

In some embodiments, strokes gained methodology may include the use of player skill adjustments. For example, when comparing strokes gained statistics against other players in a given tournament, all players' skill levels are taken into account and statistics are adjusted accordingly.

In some embodiments, strokes gained methodology may be used to quantify the effect of one or more weather factors, such as temperature, wind speed, precipitation, wind direction, humidity, etc.

In some embodiments, strokes gained methodology may be used to quantify the difference between different pieces of golf equipment, or determine their compatibility with a particular golfer or group of golfers, such as golf clubs, golf balls, gloves, clothing, tees, and putters. Such information may be used for club fitting, ball fitting, or any other fitting or matching of equipment with a player.

In some embodiments, strokes gained methodology may be used to quantify different methods of play, such as different mental approaches, different strategies, different targets, etc.

In some embodiments, strokes gained methodology may be used to provide a scoring system or other means of comparison between two or more players. These players could be compared in a single location or different locations, at the same time or at different times, in certain categories, for whole rounds, particular shots or groups of shots, etc.

In some embodiments, strokes gained methodology may be used to establish targets or goals for any given shot or group of shots. For example, a mobile device during a game of golf may display various proximities to a hole for an upcoming shot based upon different levels of golf skill. For example, targets may be displayed before performing a shot representing average outcomes for PGA TOUR pros, Tiger Woods, scratch golfers, 10 handicap golfers, 20 handicap golfers, etc. Similarly, in some embodiments a shot could be graded after it is performed according to certain skill levels. For example, a shot could be identified as a scratch-level shot, a 10 handicap level shot, etc.

Computer Output System for Outputting Strokes Gained Data and/or Statistics onto a Computer, Tablet, Smart Phone, Mobile Computing Device, or Other Computing Device:

Once strokes gained statistics are generated for one or more golfers, they may be outputted or presented. Statistics may be presented to individual golfers or to a larger audience. The presentation of statistics allows individual golfers and other interested parties access to unprecedented game analysis.

Accordingly, at least some embodiments may include a computer output system for outputting strokes gained data and/or statistics.

In some embodiments, statistics may be presented in a format compatible with various types of computers. Computers may include home computers, laptops, tablets, smart phones, etc.

In some embodiments, the presentation of statistics may include a "player profile", accessed by individual players, showing various strokes gained statistics. These statistics may include any of those described above and below. For example, statistics may include strokes gained values for a given distance range, a given lie type, a given lie type and distance range combination, etc. Statistics may represent values for a single round of golf, a "per shot" value in a given category, or results for a given parcel of time over a larger range of time.

In some embodiments, statistics and other strokes gained information may be presented in the form of a table. For example, strokes gained values for a given distance or distance range and/or lie type may be displayed.

In some embodiments, statistics may be presented in the form of a graph. Graphs may include bar graphs, line graphs, or various other graph styles.

In some embodiments, statistics and other strokes gained related information may be presented in real time, as a golfer plays a round of golf, on a smart phone, tablet, or other mobile device. In other embodiments, a golfer may be presented with statistics and other strokes gained information at the completion of a game of golf, for example on a computer in the clubhouse or on a mobile computer. In other embodiments, statistics may be presented at a time of the golfer's choosing, for example on a home computer or some other computing device accessed by the golfer.

In some embodiments, a golfer may be presented with statistics on the same mobile device that is also capable of collecting shot data. The mobile device may fit any of the descriptions provided above and below.

Methods of Facilitating the Production and Presentation of Strokes Gained Golf Statistics:

Additional potential features of this aspect of the invention relate to methods of operating and/or using the systems described above, e.g., for facilitating the production and presentation of strokes gained golf statistics.

In some embodiments, steps may include collecting at least essential shot data with one or more mobile devices, and transferring shot data to a database.

In some embodiments, steps may include carrying one or more mobile devices during a game of golf, determining distance-to-hole automatically using laser or GPS technology, recording the distance-to-hole using the automatically determined distance or by manual override, determining the lie type of a ball at rest using human judgment, recording the appropriate lie type on the device, and transferring shot data to a database.

In some embodiments, steps may include collecting shot data with one or more mobile devices, compiling shot data in a database, analyzing shot data utilizing strokes gained methodology, and presenting strokes gained statistics on a computer.

In some embodiments, steps may include collecting shot data with one or more mobile devices, transferring shot data to a database, compiling shot data from multiple sources in a database, analyzing shot data in the database using strokes gained methodology, and outputting statistics and other strokes gained information to golfers and other interested parties.

In some embodiments, steps may include receiving shot data from one or more mobile devices that are capable of collecting shot data during games of golf, compiling the received shot data in a database, analyzing the shot data in the database utilizing strokes gained methodology, and presenting the resulting strokes gained statistics and other strokes gained information to golfers.

Specific Examples of Systems and Methods According to the Invention:

Turning now to FIGS. 1-14, various embodiments and alternatives of mobile devices for the collection and transfer of data are disclosed. These embodiments are described as including a variety of alternative options. Other methods may be easily substituted for those disclosed. Many alternatives to those disclosed specifically have also been enumerated. A person having ordinary skill in the art can make those substitutions and modifications, and those substitutions and modifications should be considered to come within the scope of the disclosure.

The various figures in this application illustrate examples of features of methods, systems, and apparatus for facilitating the production and presentation of strokes gained golf statistics, in accordance with examples of this invention. When the same reference number appears in more than one drawing, that reference number is used consistently in this specification and the drawings to refer to the same or similar parts throughout.

FIG. 1 illustrates one example of a mobile device that may be used to collect data during a game of golf. In this example, the device is similar to a commercially available handheld GPS device, redesigned to accommodate strokes gained data collection.

This example device is carried by the golfer during a round of golf. In this example, the device has a touchscreen display 1 which shows a data collection screen page. Typically, a golfer would be able to access several different "screen pages" to be shown on the display screen. In this example, two such additional screen pages are accessible by selecting buttons on the data collection screen page, using a "go to navigation screen page" button 30 and a "go to scorecard screen page" button 31. Many other screen pages are possible: those shown merely serve as examples.

The data collection screen page shown is designed to collect shot data during play. In this example, the data collected includes lie type, distance-to hole, and club type. Generally, in this example a golfer would record these three types of shot data before and after each stroke during a game of golf. For example, a golfer standing on the tee of the first hole would record the three types of data from the tee position and also for each position of the ball at rest after each shot is performed, until the ball is in the cup on the first hole. This would then be repeated for each hole played, recording data before and after every shot.

In this example, additional information is displayed on the display screen 1. This additional information includes the hole number 5, the shot number 6, and the GPS distance-to-hole reading 4.

In order to record the lie type of a ball at rest, a golfer must first determine the type of lie by using simple visual evidence and judgment. After making a lie type determination, the golfer then records the data by selecting the appropriate button from the lie type selections 7 on the display screen 1. In the example shown, the lie type categories include tee, fairway, rough, sand, penalty, green, and cup. Other lie types could easily be included, including such selections as native area, divot, different levels of rough, short-sided shots, recovery positions, fringe, etc. Lie types shown are merely shown as examples.

In this example, a "penalty" lie type selection 8 would automatically change the display screen 1 to a different screen page. This penalty type screen page is illustrated on the device shown in FIG. 2. The screen page title 14 displays at the top. This screen page allows different penalty types to be recorded, by selecting the appropriate button from the penalty type selections 9 on the display 1. In this example, penalty types include OB (Out of Bounds), LB (Lost Ball), Hz (Hazard), UNP (Unplayable), STR 1 (other one-stroke penalty), STR 2 (other two-stroke penalty), Tech 1 (one-stroke non-swing penalty), and Tech 2 (two-stroke non-swing penalty). After making the appropriate penalty selection, the screen page would switch back to the data collection screen page shown in FIG. 1. Some penalty selections would further require a lie type selection. For example, a shot into a lateral hazard would further require new data for the position after the required drop according to the rules of golf.

"In cup" 24 represents a unique lie type selection. This selection is used to record the final resting position of a ball on a given hole: the bottom of the cup. This selection is necessary to indicate the final shot on a hole, and may also offer another function: the establishment of accurate GPS position of the hole. By standing near the hole and selecting the "in cup" lie type, the golfer can accurately mark the position of the hole, and all distances-to-hole on that hole may be recalculated to accommodate the new, accurate hole position.

In order to record the distance-to-hole of a ball at rest, a golfer may utilize the automatic distance-to-hole GPS function of the mobile device. This type of GPS functionality is well-known in the art and can be accomplished in various ways, such as course mapping or determining distances between two coordinates.

In the example shown in FIG. 1, the GPS distance-to-hole reading 4 is displayed at the top of the display screen 1. If a golfer chooses to record this automatic distance-to-hole for a ball at rest, the golfer merely pushes the enter button 23. Alternatively, a golfer may choose to determine the distance-to-hole in some other way, such as using course markers or using a handheld laser device. In such a case, the golfer would utilize the manual distance override button 10, located in the distance-to-hole data entry display 20. In the example shown, manual override would require entering a new distance using the numeric keypad for manual distance entry, and subsequently entering the proper distance using the enter button 23.

Distance-to-hole on the green may be recorded in terms of smaller increments. For example, green measurements may be in feet rather than in yards. Distance-to-hole on greens may also require using the manual override feature more often than other places on the course, as GPS positioning is typically not accurate enough to determine feet-to-the-hole sufficiently. A device may employ a separate screen page to record distance-to-hole on greens, shown on the device illustrated in FIG. 3. In this example, such a screen page may automatically be displayed when a "green" lie type is selected. In this example the appropriate distance-to-hole would be selected from the putting distance selections 16, and entered, which would return the display to the data collection screen page shown in FIG. 1.

Figure 4:
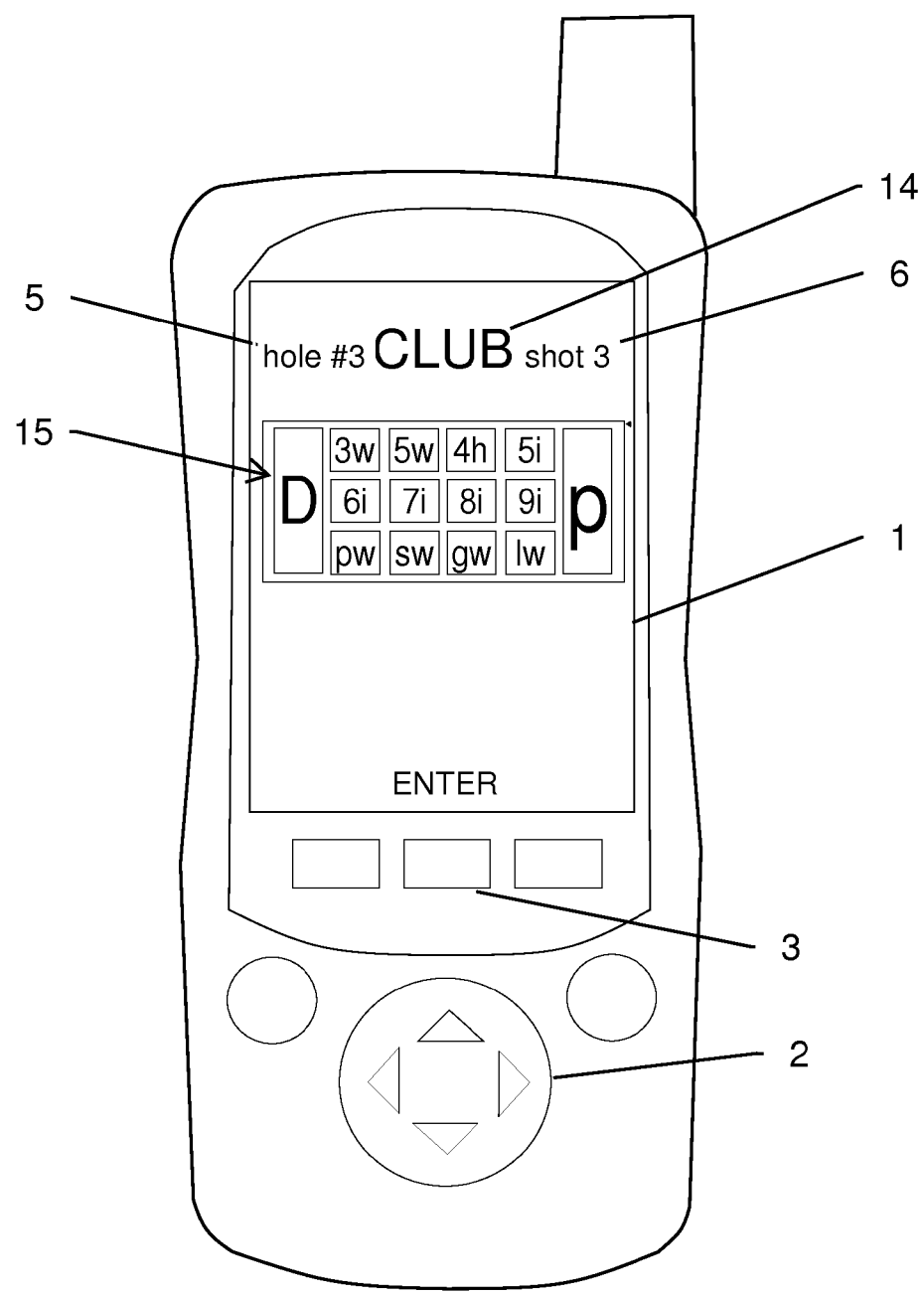
FIG. 4 illustrates a GPS type mobile device that may be used to collect data, with a display screen showing a data collection screen page for recording club type.

Referring back to FIG. 1, in order to record the club type used to perform a shot, a golfer may utilize the club selection portion 15 of the display screen 1. The clubs shown on the display may be customized by entering the appropriate clubs on a separate screen page, not shown. This customization of club selections may occur before a round of golf or at any other time. In order to record the club used for a shot, a golfer merely has to select the proper club on the display and press the enter button 23. Alternatively, club selection could be made on a separate screen page. FIG. 4 illustrates a device with a club selection screen page. In this example, an appropriate club selection would be made from the club selections 15, and entered.

Alternatively, a device may not record club type data at all. The only data necessary for strokes gained statistics is the essential shot data, described above, which includes pre-shot lie type, pre-shot distance-to-hole, post-shot lie type, post-shot distance-to-hole, and golfer identification data. While club type is useful data, it is not necessary for the production of strokes gained statistics.

In addition to the data described above, the mobile device would be capable of recording golfer identification data for the shots being taken or the round of golf being played. This information may be recorded on a separate screen page, not shown, before a round or at any other time. This golfer identification data could be permanently stored in the device until another golfer uses the device, in which case the new golfer identification data would be entered into the device.

The example device shown in FIG. 1 may be able to record more data than that described above. For example, a separate screen page could record other information before, during, or after playing a game of golf. Other data may include course information, golfer information, date, time, temperature, wind speed, wind direction, precipitation, green speed, etc. There are many types of data that such a device may be able to record. The types of data listed here merely serve as examples.

The device illustrated in FIG. 1 has been described above with a touchscreen display. The touchscreen display may utilize "pop-up screens" and/or "pop-up keypads". The device may also utilize external buttons, with or without a touchscreen display. For example, the device may employ a physical "toggle" button 2, and/or one or more "select" buttons 3. Buttons may further be capable of switching display screens, such as the "go to scorecard" with selection button 3 shown. One skilled in the art will recognize that there are many possible button configurations, whether on a touchscreen or as external buttons. The button configuration shown in FIG. 1 merely provides one example of many possible button configurations.

In addition to the above features, the device shown in FIG. 1 may also possess one or more features typical of GPS golf devices. For example, the device may possess a navigation function showing distances to key course features such as front, middle, and back of the green, hazards, bunkers, etc. The device may be capable of displaying maps or aerial photos of the course, and may be able to show the position of the golfer on the course. The device may be able to measure the distance shots have traveled. There are many other features of GPS devices that are known in the art, and one or more of these features may be available on the example device.

Figure 5:
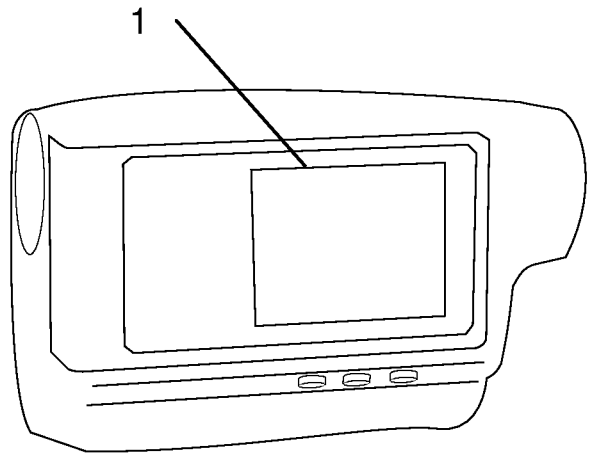
FIG. 5 illustrates a laser type mobile device that may be used to collect data.

FIG. 5 illustrates another example of a mobile device that may be used to collect data during a game of golf. Its display screen is shown in detail in FIG. 6. In this example, the device is similar to a commercially available laser device, redesigned to accommodate strokes gained data collection.

The example device display illustrated in FIG. 5 functions in a similar fashion to the example device shown in FIG. 1 described above. In this example, however, there is no GPS functionality. Instead, distance-to-hole can be determined using laser technology. This type of laser technology is well-known in the art, and is normally operated by looking through the viewfinder and arranging the view such that objects for which a distance is desired are placed behind a target indicator. Once the objects are properly arranged, typically a button is pushed which will then indicate a distance to the object.

Figure 6:
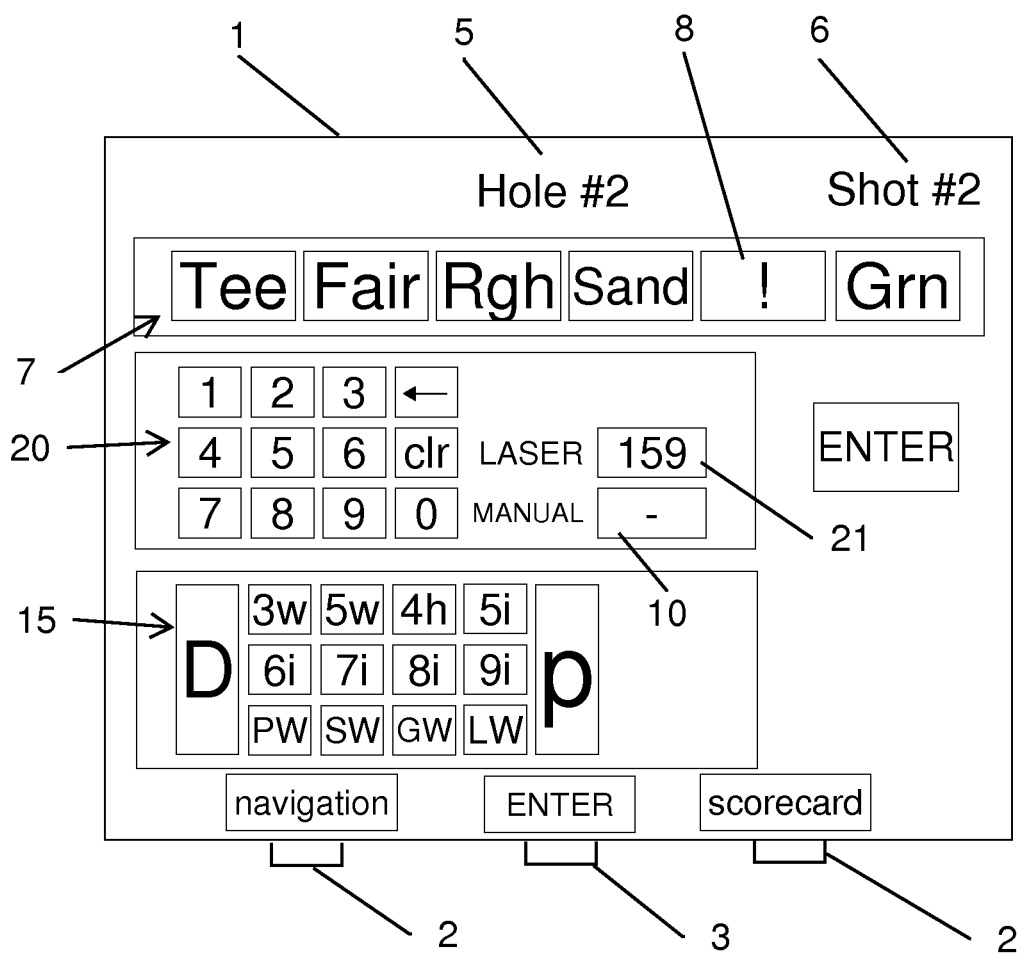
FIG. 6 illustrates a display screen showing a data collection screen page for recording lie type, distance-to-hole, and club type.

The example device is equipped with a touchscreen display screen 1, shown in FIG. 6. In this example, distance-to-hole is determined by targeting the flag in the viewfinder and pushing the appropriate button. The distance-to-hole will then be shown in the laser distance reading 21. This distance-to-hole may then be entered or manually overridden using box 10 in a fashion similar to that described above for the device shown in FIG. 1.

Beyond the different method for automatically determining the distance-to-hole, the device functions in a manner very similar to the device illustrated in FIG. 1. Lie type data is recorded using the lie type selections 7, club data is recorded using club selections 15, and distance-to-hole is recorded using the automatic laser distance reading 21 or by the manual distance override feature 10. Golfer identification data may be entered on a separate screen page, not shown.

Similar to the device shown in FIG. 1, the device shown in FIG. 5 may utilize separate screen pages to record lie type, distance-to-hole, penalty type, and/or club type. The touchscreen display may be either supplemented with or replaced by an external button system, possibly including manual toggle buttons 2 and/or one or more select buttons 3. There are many various button configurations that may be possible without departing from the invention. The device may feature other screen pages, including screen pages for other data input, scorecard, navigation, etc.

Like the device shown in FIG. 1 and described above, the laser device shown in FIG. 5 may possess many other features beyond those described above. The description above merely serves to provide an example of one type of laser device that may be used to collect data.

Figure 7:
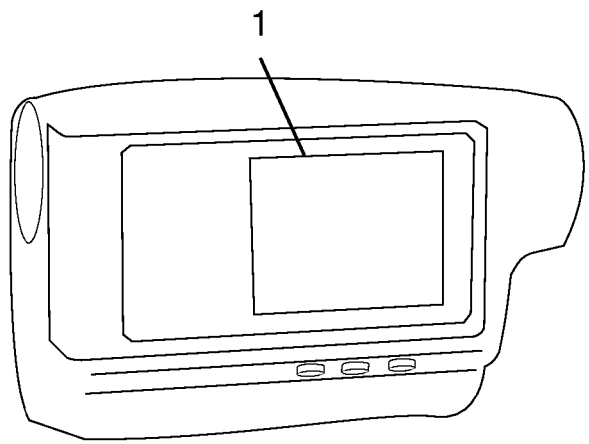
FIG. 7 illustrates a GPS/laser hybrid type mobile device that may be used to collect data.
Figure 8:
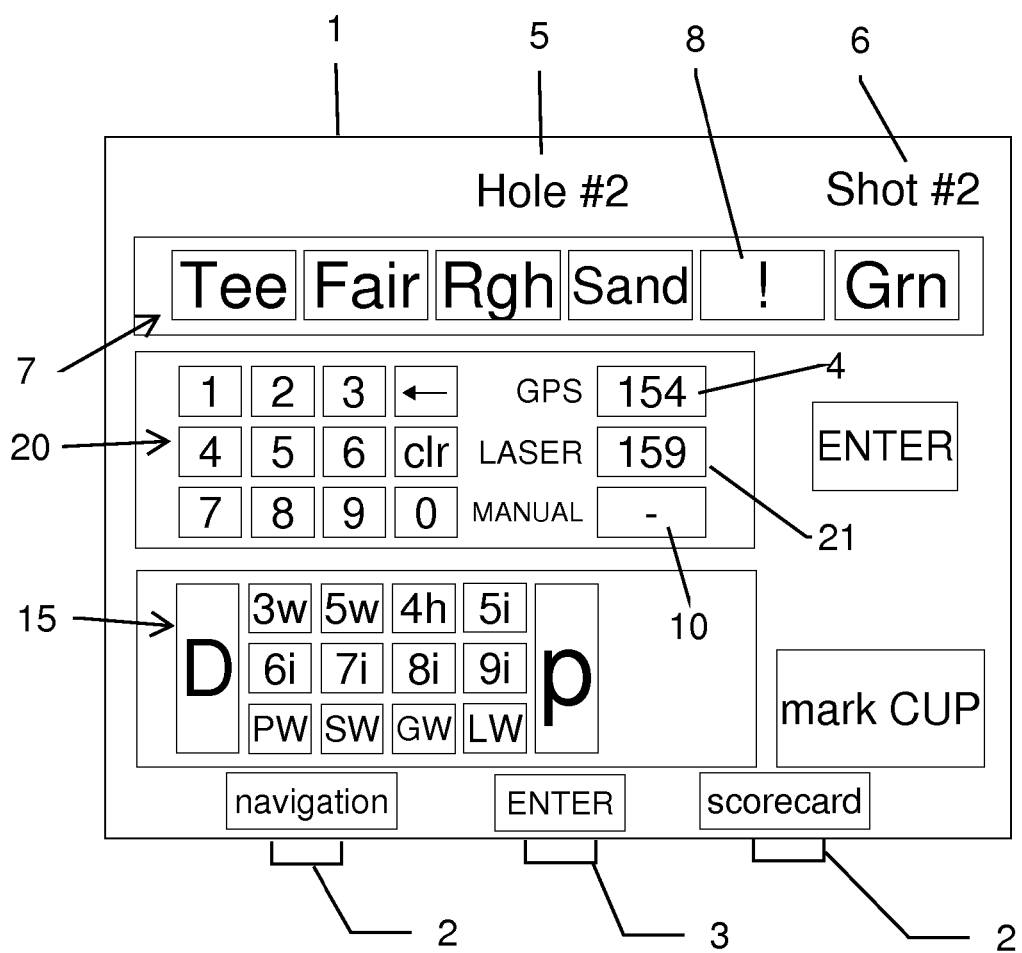
FIG. 8 illustrates a display screen showing a data collection screen page for recording lie type, distance-to-hole, and club type.

FIG. 7 illustrates another example of a mobile device that may be able to collect strokes gained data during a game of golf. In this example, the device is similar to a commercially available hybrid device that has been redesigned to accommodate strokes gained data collection The example device illustrated in FIG. 7 functions in a similar fashion to the example devices shown in FIG. 1 and FIG. 5 described above. In this example, however, there is both GPS functionality and laser functionality. This type of laser/GPS device is well-known in the art, and features both GPS and laser as a way to determine distance-to-hole. In this example, the golfer can choose the way in which distance-to-hole is recorded. On the display screen 1 shown in FIG. 8, the golfer may choose to use the GPS distance by selecting the appropriate button 4. The golfer may instead choose the laser distance by selecting the appropriate button 21. The golfer may instead choose to override both the GPS and laser distances by using the manual override feature 10. Such a choice will allow the golfer to take advantage of each technology in different situations in order to most accurately or most easily record distance-to-hole data.

Similar to other devices described above, there are many variations in form and function possible for the hybrid device illustrated in FIG. 7. The example shown is merely one possible example among many possible variations.

Figure 9:
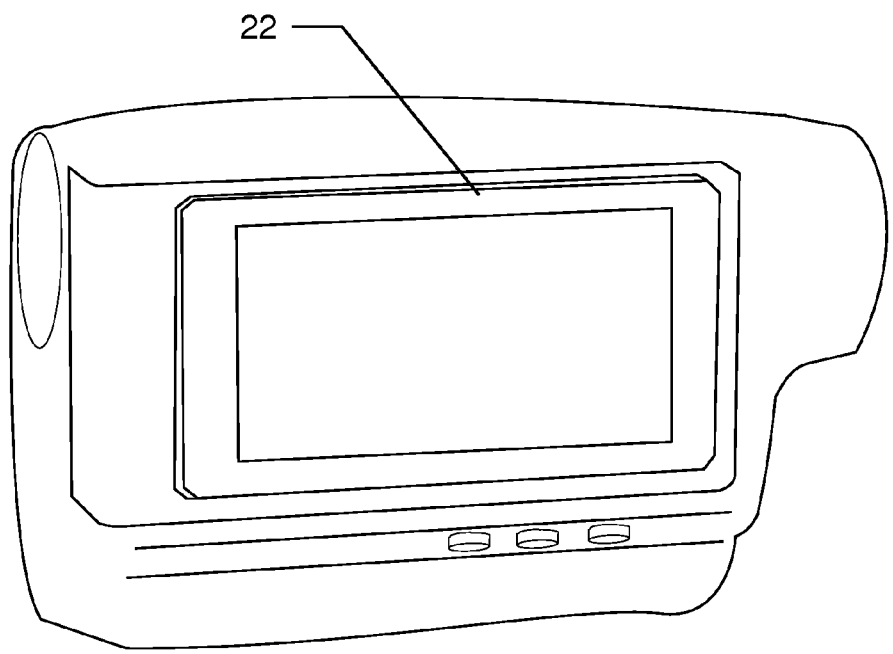
FIG. 9 illustrates a laser type mobile device that may be used to collect data, with a means for mounting a smart phone on the device.

FIG. 9 illustrates another example of a mobile device that may be able to collect strokes gained data during a game of golf. In this example, the device is similar to a commercially available laser device that has been redesigned to include a place for mounting a smart phone 22 or similar small computing device.

The example device illustrated in FIG. 9 functions in a similar fashion to the example devices shown in FIG. 5 and FIG. 6 described above. In this example, however, there is the added functionality of a smart phone, which provides GPS and touchscreen features. By adding a smart phone to a laser device, many features are added without the extra cost of a screen and GPS function. There are many commercially available applications known in the art that provide similar features to stand-alone GPS devices, including course distances, navigation, and scorecards. An application designed to work in conjunction with a laser device offers a unique solution to collecting the data necessary for the production of strokes gained golf statistics.

In this example, the laser device communicates with the smart phone using technology such as Bluetooth. Alternatively, the laser device may communicate with the smart phone with the use of a physical plug-in, which may additionally provide the ability to charge the smart phone battery.

Alternatively, a laser device may be designed to communicate with a smart phone that is not mounted on the device. Instead, the smart phone could travel separately with the golfer or with a golf bag or golf cart.

Similar to other devices described above, there are many variations in form and function possible for the hybrid device illustrated in FIG. 9. The example shown is merely one possible example among many possible variations.

Figure 10:
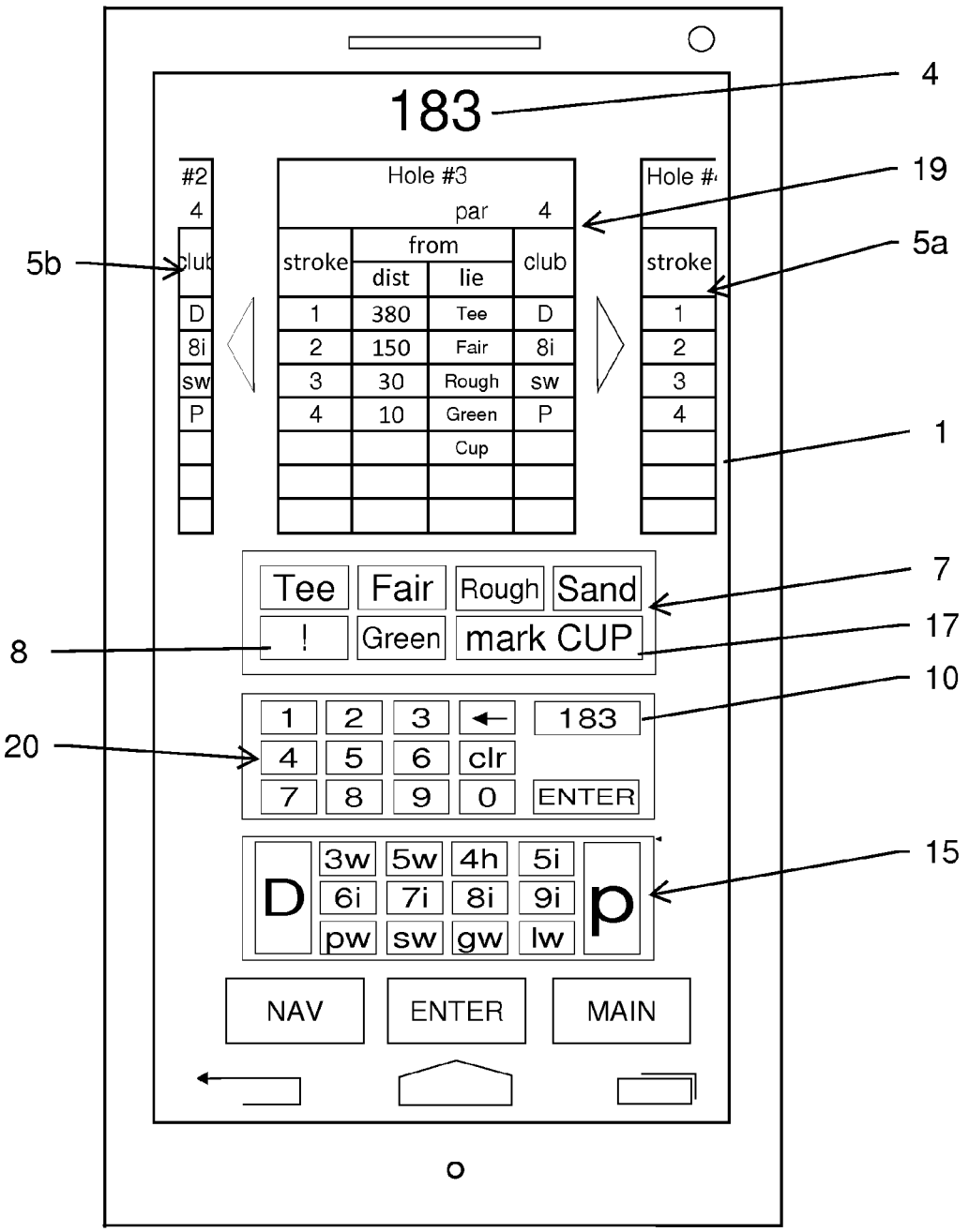
FIG. 10 illustrates a smart phone that may be used to collect data, with a display screen showing a scorecard type data collection screen page for recording lie type, distance-to-hole, and club type.

FIG. 10 illustrates another example of a mobile device that may be able to collect strokes gained data during a game of golf. In this example, the device is a smart phone that runs an application designed to accommodate strokes gained data collection.

The example device illustrated in FIG. 10 functions in a similar fashion to the example device shown in FIG. 1 described above. In this example, however, the phone utilizes its GPS functionality and touchscreen to effectively accomplish the same result as a stand-alone GPS device.

In this example, the data collection screen page shown on the display screen 1 includes a scorecard-style display 19. The scorecard-style display offers a different way to collect the data necessary for the production of strokes gained statistics. In this example, data collection for a particular shot is initiated by selecting an individual box on the scorecard-style display 19.

If a lie type box is selected, then the lie type selections 7 are highlighted, and the appropriate lie type is selected. A penalty selection 8 switches the screen page to a penalty type screen, not shown.

If the distance-to-hole box 20 is selected, then the distance-to-hole keypad 20 is highlighted, and either the GPS distance is entered or the manual distance override 10 feature is used to enter the distance manually.

If a club type box 15 is selected, then the club selection options 15 are highlighted, and the appropriate club type is entered.

The scorecard-style display 19 shown includes a swipe function which allows the golfer to toggle between holes, with a partial view of the scorecard for the next hole 5a, and for the previous hole 5b. The distance-to-hole determined by GPS is displayed 4 at the top of the screen page.

As with other devices described above, the button configuration on the touchscreen can greatly vary without departing from the invention.

Figure 11:
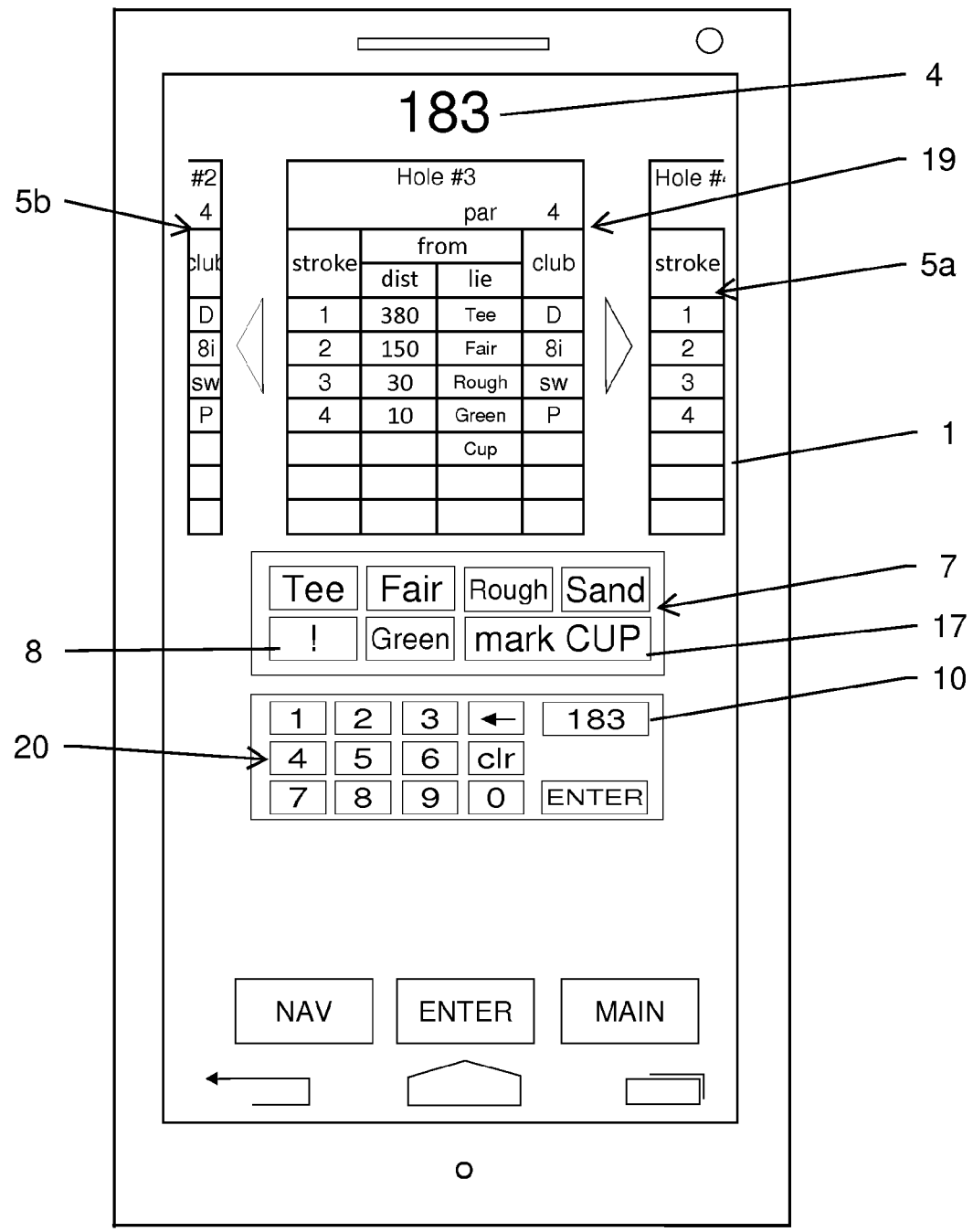
FIG. 11 illustrates a smart phone that may be used to collect data, with a display screen showing a scorecard type data collection screen page for recording lie type and distance-to-hole.

FIG. 11 illustrates a smart phone similar to the one shown in FIG. 10. In this example, however, the application lacks the ability to record club type data. The essential data required for the production of strokes gained statistics does not include club type data, so in FIG. 10 this feature has been omitted and still falls within the scope of the invention. In this example, the "in cup" lie type button 24 has been replaced with a button called "mark cup" 17, which allows for the position of the cup to be recorded using GPS coordinates. Subsequent to such a recording, all distances-to-hole on the given hole may be adjusted to accommodate the accurate new cup coordinates.

Figure 12:
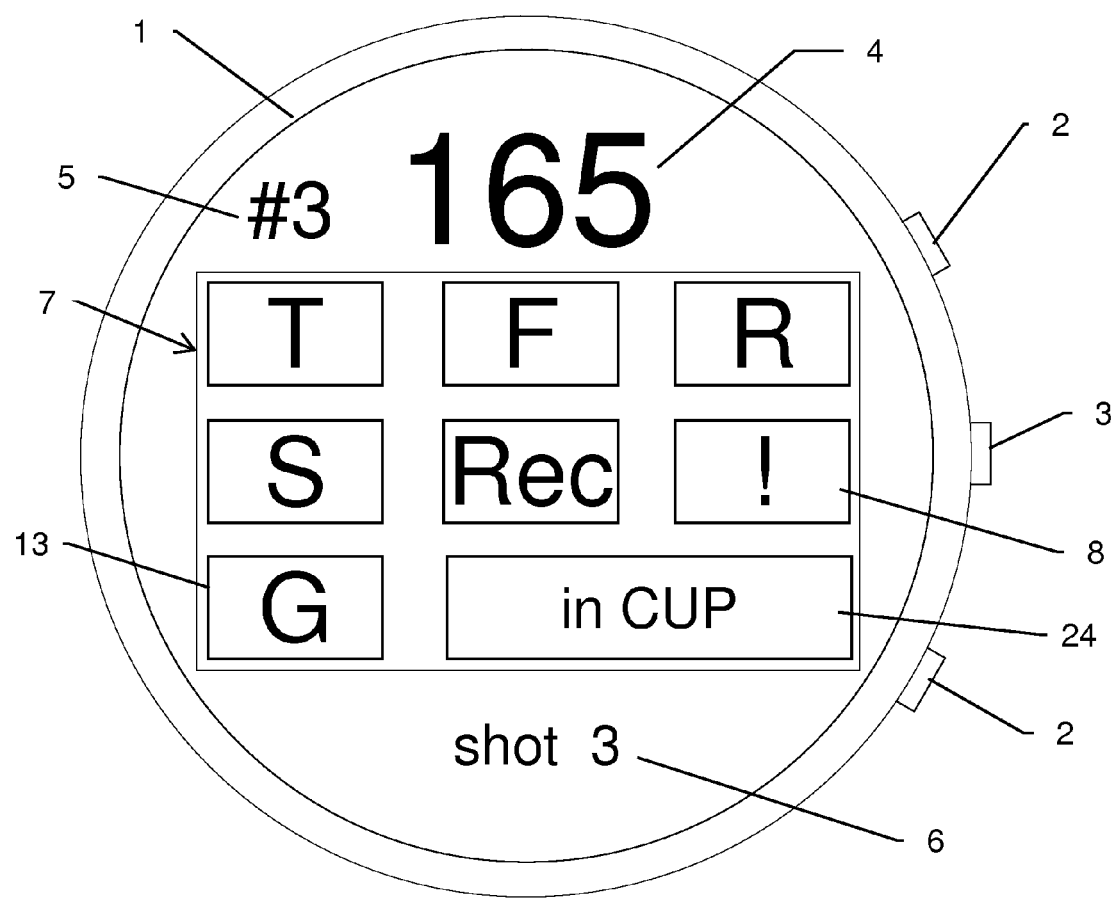
FIG. 12 illustrates a GPS type watch device that may be used to collect data, with a display screen showing a data collection screen page for recording lie type.

FIG. 12 illustrates another example of a mobile device that may be used to collect data during a game of golf. In this example, the device is similar to a commercially available watch device that has been redesigned to accommodate strokes gained data collection.

In this example, the device functions similarly to the mobile GPS device shown in FIG. 1, and described above. Such GPS watches are well-known in the art, and offer golfers GPS functionality with a small, unobtrusive profile. However, because of the reduced area of the display screen 1, the watch in this example relies instead on external toggle buttons 2 and an external select/enter button 3. Such a device may or may not be equipped with touchscreen ability. Furthermore, this watch device utilizes more screen pages than a GPS device with a larger screen. The display screen in FIG. 12 shows a lie type selection 7 screen page. The display screen 1 shown indicates the GPS distance-to-hole reading 4, the hole number 5 of the hole being played, and the shot number 6 for the hole being played. A lie type selection will take the golfer to another screen page. Other screen pages may include distance-to-hole selections, not shown, where the distance-to-hole can be entered using the GPS distance displayed or manually entered using the external buttons 2, 3.

Figure 13:
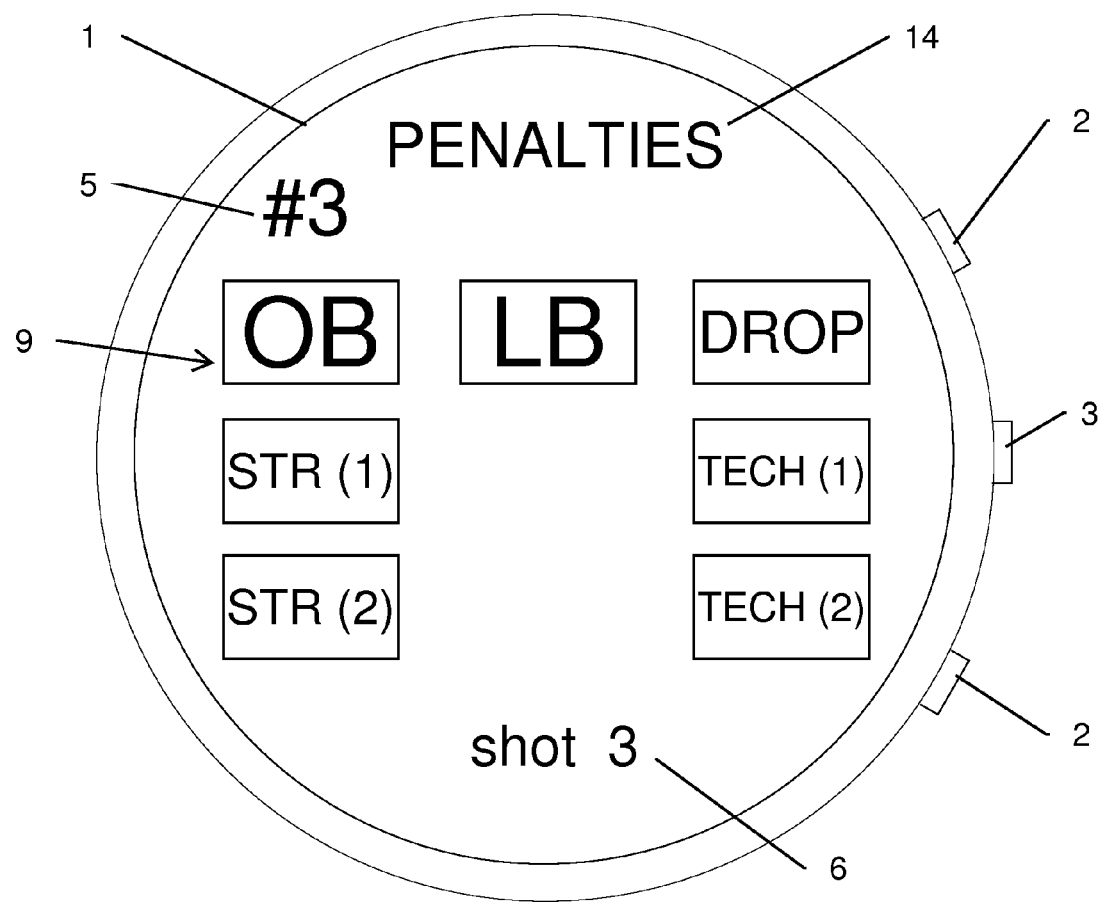
FIG. 13 illustrates a GPS type watch device that may be used to collect data, with a display screen showing a data collection screen page for recording penalty type.

If the golfer selects the "penalty" lie type 8 on the lie type selection 7 screen page, then the screen page would switch to the penalty type selections 9 screen page, shown in FIG. 13. Following the selection, the display screen 1 would then return to the screen page shown in FIG. 12.

Figure 14:
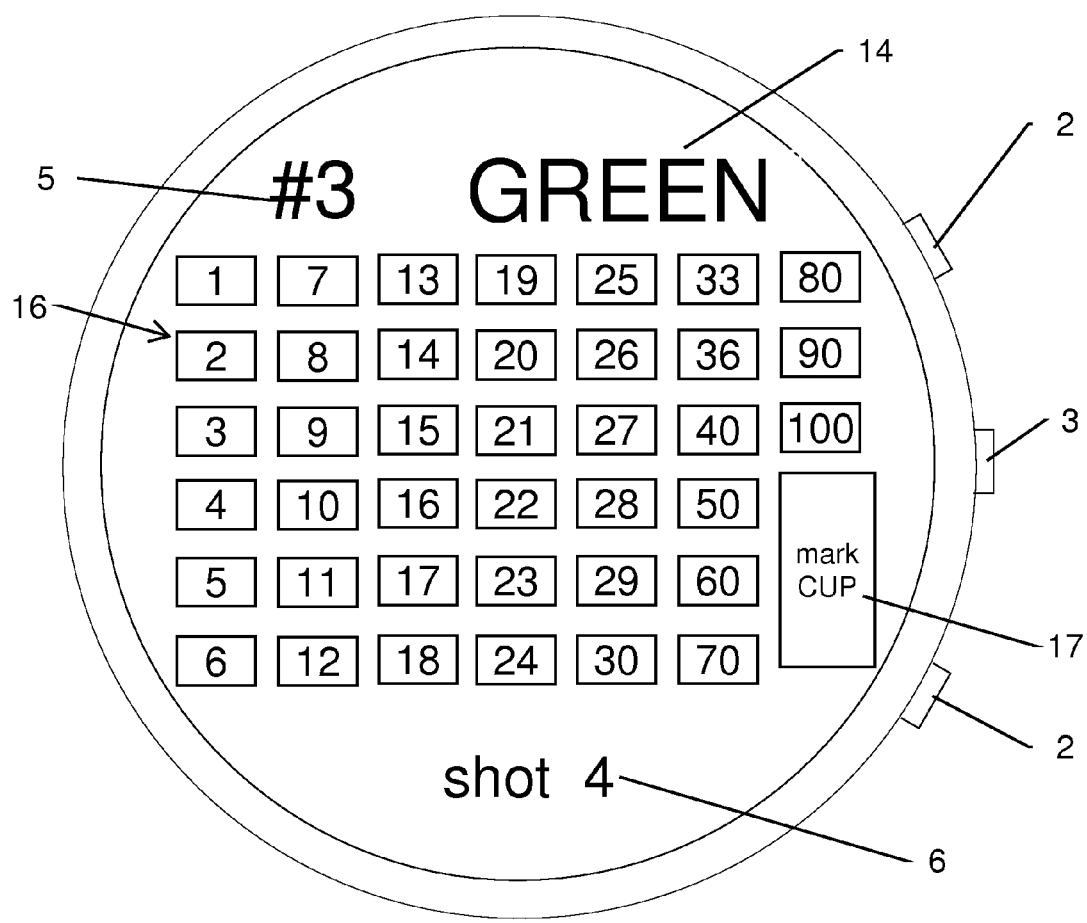
FIG. 14 illustrates a GPS type watch device that may be used to collect data, with a display screen showing a data collection screen page for recording distances on greens.

In this example shown in FIG. 12, if a golfer selects "green" as a lie type 13, then the display screen 1 would switch to a screen page as shown in FIG. 14, which allows for putting distance selections 16. Appropriate green distances would be selected using the toggle buttons 2 and the enter/select button 3. Following the selection, the display screen 1 would then return to the screen page shown in FIG. 12.

A watch device may include other screen pages like those described in examples above. For example, other screen pages could allow for club selection, other data entry, a scorecard, etc.

There are many other examples of mobile devices that may be used to collect data during a game of golf. The devices illustrated and described above merely provide some examples. One skilled in the art will recognize that there are many other devices and configurations that will allow for the requisite collection of data for the production of strokes gained statistics without departing from the invention. For example, devices that utilize voice recognition, larger devices that travel on a golf bag or golf cart, and devices worn on the body of a golfer could all be designed to include the necessary data collection. Devices worn on the body, activated by devices embedded in golf clubs are commercially available, which typically record distances and club type. Such device systems could be equipped with lie type selection functions, where the lie type would be determined by the golfer using simple visual evidence and judgment as described above.

FIG. 15 to 19 illustrate examples of possible strokes gained statistical outputs. Such statistical outputs may be available on a variety of computing devices. Graphs could widely vary in design, appearance, and in the way the statistics are presented. The graphs and tables shown merely represent some examples of statistical outputs, and are not intended to limit the invention in any way.

FIG. 15 illustrates an example of a way in which one hole may be presented on a scorecard. In the example shown, the first hole is shown to be a par 4. Each stroke is displayed with pre-shot distance-to-hole, pre-shot lie type, post-shot distance-to-hole, and post-shot lie type. Lie types are here abbreviated. "T" represents tee, "R" represents rough, "F" represents fairway, "G" represents green, and "C" represents cup. Green distances are measured in feet and all other lie types are measured in yards. Obviously, post-shot data is the same as pre-shot data for consecutive shots. The table illustrated in FIG. 15 also shows the strokes gained calculation for each shot, with negative strokes gained results in parentheses and positive strokes gained values without parentheses. The benchmark used to determine strokes gained values is the PGA TOUR benchmark known in the art and described above.

FIG. 16 illustrates an example of a strokes gained table for the same hole represented in FIG. 15. The table breaks down strokes gained results for the hole in selected distance categories, plus a par 4/par 5 tee category, and a putting category representing all shots taken with a "green" lie type. Some categories do not contain totals because no shots were performed on the hole that fit the category. The strokes gained total for the one foot putt is zero because the data shows that a one foot putt is a statistical certainty, and this is reflected in the benchmark used to determine strokes gained values. Included is a strokes gained value for the entire hole.

FIG. 17 illustrates an example of a strokes gained table representing an entire 18 hole round, including hole number one as illustrated in FIG. 15 and FIG. 16. The table includes the same categories as are shown in FIG. 16. Now, however, each category has a strokes gained value, as at least one stroke was taken in each category over the course of an 18-hole round. In this example, all the values for each category can be added together to give the strokes gained total for each round.

There are many other ways to construct a strokes gained table. There are innumerable possible categories for various distance range and lie type combinations. All categories cannot always be added to give a strokes gained total for the round. The tables illustrated serve as simple examples.

Figure 18:
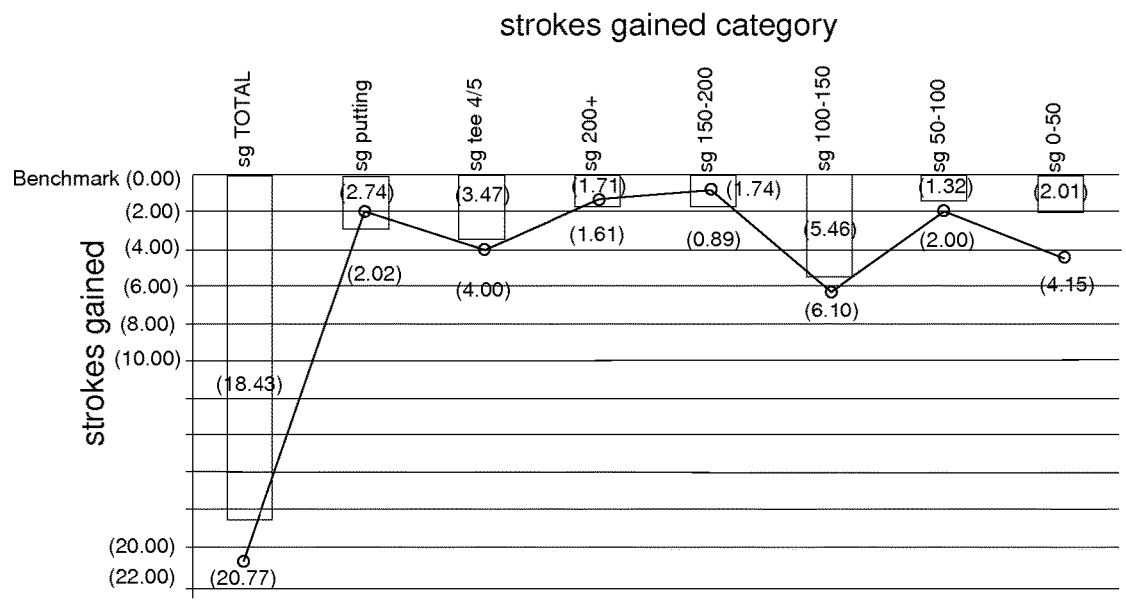
FIG. 18 illustrates an example of a graph comparing strokes gained results of one round with a strokes gained average taken over a season.

FIG. 18 illustrates an example of a graph comparing strokes gained results of one round, represented by the line graph, with an average taken over a season, represented by the bar graph. Values for multiple categories are shown. Results reflect the play of a single golfer, showing how the golfer's latest round compares with their own season average. Similar tables could be used to compare a single golfer to another golfer, or groups of golfers to other groups of golfers.

Figure 19:
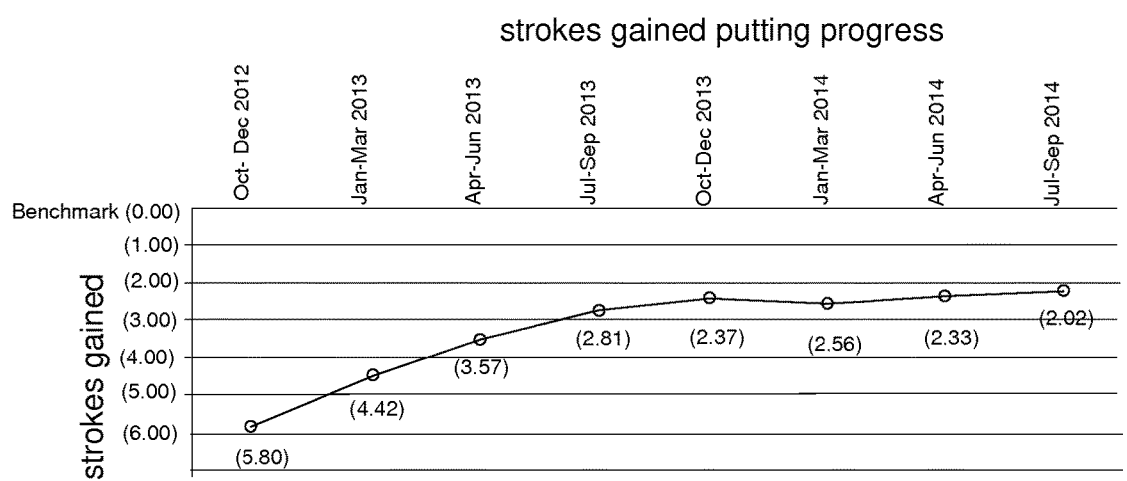
FIG. 19 illustrates an example of a graph showing how a single golfer's strokes gained putting has changed over time.

FIG. 19 illustrates an example of a graph showing how a single golfer's strokes gained putting has changed over time. In this example, all rounds played during a three month time period are averaged, and the totals for each three month period are displayed over a year time period. Similar graphs could be constructed showing any category displayed for any chunk of time over any longer range of time. The graph illustrated here represents one tiny example in a vast array of possible statistical displays.

Figure 20:
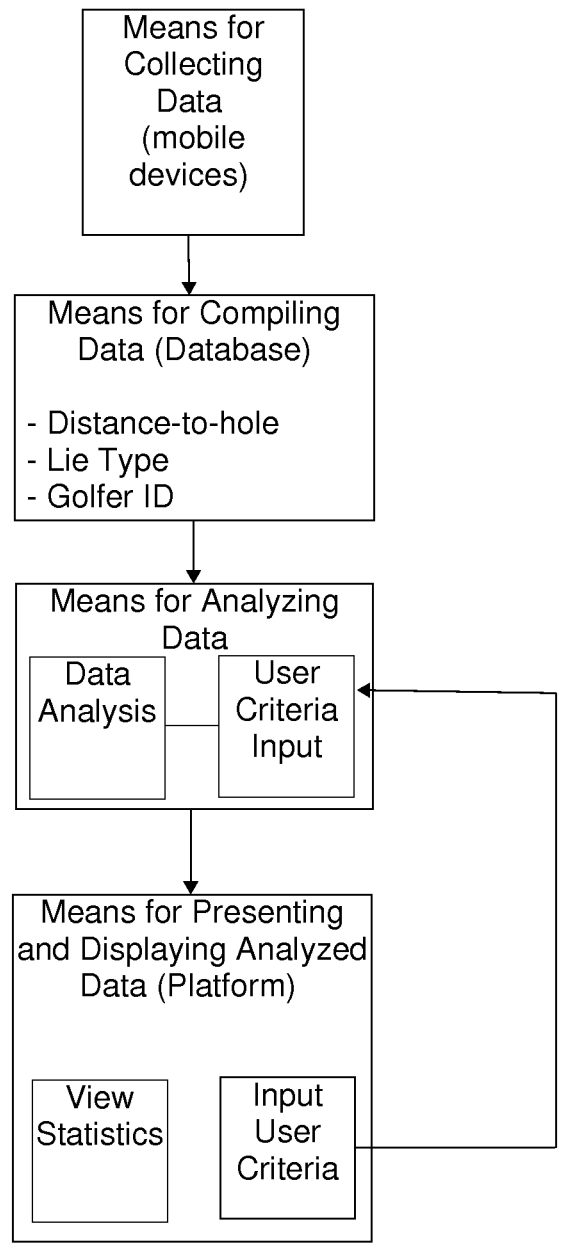
FIG. 20 illustrates a flow chart showing the production and presentation of strokes gained statistics from the collection of data to the presentation/output of strokes gained statistics.

FIG. 20 illustrates a flow chart showing the production and presentation of strokes gained statistics from the collection of data to the presentation/output of strokes gained statistics. The illustration shows the four main components in the total system: mobile devices for collecting data, a database for compiling data, strokes gained methodology for analyzing the data in the database, and a platform for displaying and presenting analyzed data in the form of statistics.

Conclusions, Ramifications, Scope:

Strokes gained analytics offer a revolutionary tool to measure skill in the game of golf, providing valuable statistics to golfers of all levels. However, the current state of the art finds that strokes gained statistics are not accessible or available to golfers, so the potential is not realized. The solution to the problem lies in making the collection of the necessary data during games of golf simple and unobtrusive, and making the transfer of that data to a database designed for strokes gained analysis automatic. Collecting the necessary data manually and entering the data afterward is a tedious task that most golfers are not willing to take on.

However, the collection and transfer of data can be made far more efficient and unobtrusive with the use of mobile devices such as GPS devices, laser devices, hybrid devices, and/or smart phones. Designing such devices to accommodate the collection and transfer of strokes gained data makes strokes gained statistics available to everyone. Because these devices have built-in distance-to-hole functionality, the recording of the essential data necessary for strokes gained analysis can be greatly facilitated, requiring a mere push of a button when standing near a ball at rest during play. Lie type is determined by simple human judgment, and recorded by simply selecting the appropriate button on the device. This method of lie type determination is very reliable and not prone to the same errors inherent in "automatic" lie type determinations made using GPS positioning technology. Combining these two simple methods of data collection, and offering the electronic storage and transfer of the necessary data to a functional database, elegantly facilitates the production of strokes gained statistics, and opens up this valuable evaluation tool to any golfer.

With strokes gained analytics made easily and broadly available, the thriving worldwide golf industry is poised to dramatically change the way it measures and evaluates the game. Beyond the ability to measure player skill with unprecedented accuracy, strokes gained methodology has far reaching implications. Essentially any factor in the game of golf can be accurately quantified with this new tool. The difficulty of holes, courses, pin positions, different green speeds, and different cuts of rough can all be accurately quantified. Course ratings and player handicaps can be more accurately calculated. Factors like weather can be quantified, such as wind speed, wind direction, temperature, precipitation, and humidity. Various golf equipment can be measured and compared, potentially offering a valuable tool for club fitting and ball selection. Games between players across continents can be designed and implemented. Golfers can know precisely the level of quality of each shot. Before performing a shot, players can know the quality level of various outcomes.

The widespread accessibility of strokes gained analytics promises to alter the golf landscape. With a few simple pushes of a button, any golfer can enjoy the benefits of this powerful new tool.

The invention claimed is:

1. A mobile device to record, display, and transmit essential shot data and strokes gained statistics, comprising:
   GPS, laser, or radar to automatically determine distance-to-hole while playing a hole in a game of golf;
   a display screen to view, select and record essential shot data for one or more golf shots;
   a user interface to input, select, edit, confirm and transmit said essential shot data for one or more shots, said essential shot data comprising the combination of at least all five of the following:
      distance-to-hole of the ball at rest before said golfer performs said one shot, thereby establishing pre-shot distance-to-hole data for said one shot, and;
      distance-to-hole of said ball at rest after said golfer performs said one shot, thereby establishing post-shot distance-to-hole data for said one shot, and;
      lie type of said ball before said golfer performs said one shot, said lie type determined by human judgment, said lie type selected from a group of specific classifications including but not limited to: tee, fairway, rough, sand, and green, thereby establishing pre-shot lie type data for said one shot, and;
      lie type of said ball after said golfer performs said one shot, said lie type determined by human judgment, said lie type selected from a group of specific classifications including but not limited to: tee, fairway, rough, sand, green, and in-cup, thereby establishing post-shot lie type data for said one shot, and;
      identity of said golfer performing said shot, thereby establishing golfer identification data for said one shot;
      additional classifications of said lie type including one or more of: native area, recovery, different types of rough, short-sided shots, penalty type, and divot;
   wherein said display screen includes display of strokes gained information derived from said essential shot data for one or more shots while playing said game of golf, said strokes gained information including one or more of: maps of golf holes with strokes gained benchmarks; strokes gained benchmarks; strokes gained tables, graphs, and diagrams; strokes gained comparisons with other golfers; strokes gained statistics; strokes gained course difficulty ratings; strokes gained difficulty ratings for different lie types; targets representing different strokes gained benchmarks; strokes gained ratings for zones on a golf course;
   a transmitter to upload said essential shot data to a database.

2. The mobile device of claim 1, further including a user interface to record additional data, said additional data including one or more of: club data, course identification data, hole number data, tees played data, shot number on hole data, penalty shot data, total round data, date data, time data, age of golfer data, handicap index of golfer data, temperature data, wind speed data, wind direction data, tournament or non-tournament data, green speed data, rough cut data, and grass type data.

3. The mobile device of claim 1, wherein said user interface includes ball position coordinates using GPS technology.

4. The mobile device of claim 1, wherein said user interface includes hole position coordinates using UPS technology.

5. The mobile device of claim 1, wherein said user interface includes said essential shot data for all shots performed during a round of golf.

6. The mobile device of claim 1, further including a receiver to download said strokes gained information to said mobile device for display.

7. A data collection and processing system to facilitate the production of strokes gained golf statistics, comprising:
   one or more mobile devices, each providing:
      a first means for traveling with a golfer during a game of golf;
      a second means for determining distance-to-hole while playing a hole in said game of golf automatically, using one or more of GPS, laser, or radar;
      a third means to input, select, edit, confirm and transmit essential shot data for one or more golf shots while playing said game of golf, said essential shot data for one shot comprising the combination of at least all five of the following:
         distance-to-hole of the ball at rest before said golfer performs said one shot, thereby establishing pre-shot distance-to-hole data for said one shot, and;
         distance-to-hole of said ball at rest after said golfer performs said one shot, thereby establishing post-shot distance-to-hole data for said one shot, and:
         lie type of said ball before said golfer performs said one shot, said lie type determined by human judgment, said lie type selected from a group including but not limited to: tee, fairway, rough, sand, and green, thereby establishing pre-shot lie type data for said one shot, and;
         lie type of said ball after said golfer performs said one shot, said lie type determined by human judgment, said lie type selected from a group including but not limited to: tee, fairway, rough, sand, green, and in-cup, thereby establishing post-shot lie type data for said one shot, and;
         the identity of said golfer performing said one shot, thereby establishing golfer identification data for said one shot wherein said mobile device further includes a means to display strokes gained information derived from said essential shot data for one or more shots while playing said game of golf, said strokes gained information including one or more of: maps of golf holes with strokes gained benchmarks; strokes gained benchmarks; strokes gained tables, graphs, and diagrams; strokes gained comparisons with other golfers; strokes gained statistics; strokes gained course difficulty ratings; strokes gained difficulty ratings or different lie types; targets representing different strokes gained benchmarks; strokes gained ratings for zones on a golf course;
      a fourth means for transferring said essential shot data for one or more golf shots to one or more databases;
   one or more databases for compiling shot data from one or more said mobile devices;
   a system to arrange said shot data in said databases in order to make possible strokes gained statistical analysis.

8. The system according to claim 7, wherein said mobile device further includes a means to record additional data, said additional data including one or more of: club data, course identification data, hole number data, tees played data, shot number on hole data, penalty shot data, total round data, date data, time data, age of golfer data, handicap index of golfer data, temperature data, wind speed data, wind direction data, tournament or non-tournament data, club data, green speed data, rough cut data, and grass type data.

9. The system according to claim 7, wherein said lie type further includes one or more of: native area, recovery, different types of rough, short-sided shots, penalty type, and divot.

10. The system according to claim 7, wherein said mobile device further includes a means to record ball position using GPS technology or coordinates.

11. The system according to claim 7, wherein said mobile device further includes a means to record hole position using GPS technology or coordinates.

12. The system according to claim 7, further including a means to record said shot data for all shots performed during a round of golf.

13. The system of claim 7, further including a data analysis system to analyze data using strokes gained methodology, thereby generating strokes gained golf statistics.

14. The system of claim 13, further including an output system to output strokes gained statistics using a computer platform.

15. The system of claim 14, wherein said output system includes a website.

16. The system of claim 7, farther including means to download said strokes gained information to said mobile device for display.

* * * * *